(12) United States Patent
Sánchez De La Fuente et al.

(10) Patent No.: US 12,375,702 B2
(45) Date of Patent: Jul. 29, 2025

(54) FILE FORMAT SCHEMES ALLOWING EFFICIENT ROI, STREAM ACCESS AND PARAMETER SET HANDLING

(71) Applicant: Fraunhofer-Gesellschaft zur Förderung der angewandten Forschung e.V., Munich (DE)

(72) Inventors: Yago Sánchez De La Fuente, Berlin (DE); Dimitri Podborski, Berlin (DE); Karsten Grueneberg, Berlin (DE); Cornelius Hellge, Berlin (DE); Thomas Schierl, Berlin (DE); Robert Skupin, Berlin (DE); Thomas Wiegand, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 366 days.

(21) Appl. No.: 17/936,756

(22) Filed: Sep. 29, 2022

(65) Prior Publication Data
US 2023/0015840 A1    Jan. 19, 2023

Related U.S. Application Data

(63) Continuation of application No. PCT/EP2021/058761, filed on Apr. 1, 2021.

(30) Foreign Application Priority Data

Apr. 2, 2020 (EP) .................................... 20167862

(51) Int. Cl.
*H04N 19/44* (2014.01)
*H04N 19/31* (2014.01)
*H04N 19/70* (2014.01)

(52) U.S. Cl.
CPC ............. *H04N 19/44* (2014.11); *H04N 19/31* (2014.11); *H04N 19/70* (2014.11)

(58) Field of Classification Search
CPC ........ H04N 19/31; H04N 19/44; H04N 19/70; H04N 21/84; H04N 21/8451
See application file for complete search history.

(56) References Cited

U.S. PATENT DOCUMENTS

2010/0153395 A1* 6/2010 Hannuksela ..... H04N 21/85406
707/E17.089
2013/0195171 A1* 8/2013 Wang ...................... H04N 19/46
375/240.02

(Continued)

FOREIGN PATENT DOCUMENTS

GB       2550604 A     11/2017
WO    2013163569 A1    10/2013

OTHER PUBLICATIONS

"MP4 File Creator for SVC Adaptive Video Streaming"—Gao et al., 2010 International Conference on Internet Technology and Applications. (Year: 2010).*

*Primary Examiner* — Mainul Hasan
(74) *Attorney, Agent, or Firm* — PERKINS COIE LLP; Michael A. Glenn

(57) ABSTRACT

File format concepts for video files are described. It is proposed to that descriptive data of a file indicates whether a parameter set for a track of a file is forwarded when jointly decoding a sub-stream of the track and a further track, and/or that a file includes, for a sub-stream of a video stream signaled in the file, an alternative parameter set to a parameter set for fully decoding the track, the alternative parameter set being for decoding the sub-stream, so as to allow for switching between multiple tracks of a file, and/or that step-wise stream access pictures of a track of a file are marked as stream access point pictures for accessing the (Continued)

track, and/or that a temporal length within which a decoder refresh in case of a joint decoding of sub-streams distributed over multiple tracks is indicated in a file, and/or that a file provides information from which it is derivable whether a pixel aspect ratio varies.

14 Claims, 22 Drawing Sheets

(56) References Cited

U.S. PATENT DOCUMENTS

| | | |
|---|---|---|
| 2014/0093180 A1 | 4/2014 | Esenlik et al. |
| 2015/0110192 A1* | 4/2015 | Wang .................... H04N 19/573 375/240.16 |
| 2016/0165248 A1 | 6/2016 | Lainema et al. |
| 2016/0234526 A1 | 8/2016 | Wang et al. |
| 2017/0134708 A1* | 5/2017 | Wang .................... H04N 9/8042 |
| 2017/0171282 A1* | 6/2017 | Denoual ................ H04N 19/46 |
| 2018/0277164 A1* | 9/2018 | Wang .................. H04N 21/2353 |
| 2019/0014162 A1* | 1/2019 | Denoual .............. H04N 19/186 |
| 2019/0124419 A1* | 4/2019 | Denoual ................ H04N 19/30 |
| 2022/0051443 A1* | 2/2022 | Hamza .................. H04N 19/70 |
| 2024/0267560 A1* | 8/2024 | Hannuksela ......... H04N 19/597 |

* cited by examiner

FILE FORMAT SCHEMES ALLOWING EFFICIENT ROI, STREAM ACCESS AND PARAMETER SET HANDLING

CROSS-REFERENCE TO RELATED APPLICATIONS

This application is a continuation of copending International Application No. PCT/EP2021/058761, filed Apr. 1, 2021, which is incorporated herein by reference in its entirety, and additionally claims priority from European Applications No. 20167862.0, filed Apr. 2, 2020, which is also incorporated herein by reference in its entirety.

BACKGROUND OF THE INVENTION

Embodiments of the present invention relate to file format parsers for parsing a file comprising information about one or more pictures of a video stream. Further embodiments relate to file generators for generating a file comprising information about one or more pictures of a video stream. Further embodiments relate to video decoders and video encoders. Embodiments of the present invention relate to methods for parsing a file comprising information about one or more pictures of a video stream. Further embodiments relate to methods for generating a file comprising information about one or more pictures of a video stream.

Further embodiments relate to a client device for downloading media data from a server. Further embodiments of the present invention relate to files, such as data files comprising information about one or more pictures of a video stream. Further embodiments of the present invention relate to a manifest file describing media data downloadable by a client from a sever. Further embodiments relate to a method for downloading media data from a server. Encoded video data may be stored or transmitted in the form of one or more files. These files may comprise, beyond the coded video data itself, information about the structure of the coded video data and/or information about how the coded video data is structured within the file. In order to allow for an efficient decoding of the video data stored in the file and/or for a high compatibility of the file to decoders having different capabilities, and/or in order to allow an efficient extraction of a portion of the video stream stored in the file so as to efficiently exploit resources of the decoder, it is desirable to have a flexible concept for generating and/or parsing the file, which at the same time involves low coding overhead.

A video stream indicated in a file may comprise multiple sub-streams. A sub-stream may be a portion of the video stream in terms of a stream of sub-pictures of the pictures of the video stream, or in terms of a temporal sub-stream, for example, a stream having a lower frame rate. The video stream and/or the sub-streams may be distributed over one or more tracks of the file. For example, each of the sub-streams may be stored in a separate track of the file, i.e., the video stream is distributed over the multiple tracks. In examples, also a sub-stream may be distributed over multiple tracks of the file. Tracks of the file may comprise coded pictures or portions thereof. Additionally, a track may comprise a parameter set indicating information about the coded video data of the track or another track. For example, the parameter set may indicate how to extract the video stream or a sub-stream from the file or how to decode the video stream or the sub-stream. Parameters of the parameter set may refer to a particular sub-stream, for example, a sub-stream indicated by the track comprising the parameter set. In other examples, a parameter set may refer to a stream comprising multiple sub-streams, or the entire video stream, which are distributed over multiple tracks. In this case, for example, a parameter set referring to a single sub-stream may be unnecessary for the decoder for decoding the stream which is composed of multiple sub-streams.

SUMMARY

An embodiment may have a file format parser configured to receive a file containing a set of tracks onto which sub-streams of a video bitstream are distributed; inspect descriptive data within the file whether the descriptive data indicates for a predetermined track of the set of tracks, that a parameter set present in the file for the predetermined track is to be ignored when jointly decoding sub-streams distributed onto more than the predetermined track of the set of tracks; if the descriptive data indicates for the predetermined track of the set of tracks, that the parameter set present in the file for the predetermined track are to be ignored when jointly decoding the sub-streams distributed onto the more than the predetermined track of the set of tracks, forwarding the sub-streams distributed onto the more than the predetermined track of the set of tracks to decoding without forwarding the parameter set, and if the descriptive data does not indicate for the predetermined track of the set of tracks, that the parameter set present in the file for the predetermined track are to be ignored when jointly decoding the sub-streams distributed onto the more than the predetermined track of the set of tracks, forwarding the parameters set along with the sub-streams distributed onto more than the predetermined track of the set of tracks to the decoding.

According to another embodiment, a method for processing a file may have the steps of: receive the file, the file containing a set of tracks onto which sub-streams of a video bitstream are distributed; inspect descriptive data within the file whether the descriptive data indicates for a predetermined track of the set of tracks, that a parameter set present in the file for the predetermined track is to be ignored when jointly decoding sub-streams distributed onto more than the predetermined track of the set of tracks; if the descriptive data indicates for the predetermined track of the set of tracks, that the parameter set present in the file for the predetermined track are to be ignored when jointly decoding the sub-streams distributed onto the more than the predetermined track of the set of tracks, forwarding the sub-streams distributed onto the more than the predetermined track of the set of tracks to decoding without forwarding the parameter set, and if the descriptive data does not indicate for the predetermined track of the set of tracks, that the parameter set present in the file for the predetermined track are to be ignored when jointly decoding the sub-streams distributed onto the more than the predetermined track of the set of tracks, forwarding the parameters set along with the sub-streams distributed onto more than the predetermined track of the set of tracks to the decoding.

Another embodiment may have a file format parser configured to receive a file which has temporal layers, which a video bitstream is hierarchically composed of, inserted into a set of tracks of the file by distributing the temporal layers onto the set of tracks in groups of one or more temporal layers so that each group is inserted into a track associated with the respective group; determine, for a predetermined track of the set of tracks, an indication of a predetermined STSA picture in a lowest temporal layer among the group of one or more temporal layers associated with the predetermined track, for which, for each other temporal layer of the group of one or more temporal layers associated with the predetermined track, a picture which firstly follows the predetermined STSA picture in decoding order among pictures of the respective temporal layer, is of an STSA type, or for each other temporal layer of the group of one or more temporal layers associated with the predetermined track, a picture which firstly follows the predetermined STSA picture in presentation order among pictures of the respective temporal layer, is of an STSA type, and use the predetermined STSA picture in the predetermined track as stream access point.

Another embodiment may have a client device configured to download and inspect a manifest file including a first definition of a set of media representations downloadable by the client along with dependencies among the media representations; a second definition of, for a predetermined media presentation, a set of sub-representations embedded into the predetermined media representation along with dependencies among the sub-representations; an indication, which indicates, for the predetermined representation, segments of the predetermined media representation which contain a stream access point in an independent sub-representation of the set of sub-representations embedded into the predetermined media representation, which is independent from any other sub-representation of the set of sub-representations, at which segment switching to the predetermined representation is feasible, decide, based thereon, which media representation or which sub-representation to download from the server.

Another embodiment may have a client device configured to download and inspect a manifest file including a first definition of a set of media representations downloadable by the client along with dependencies among the media representations; wherein temporal layers, which a video bitstream is hierarchically composed of, are distributed onto the set of representations; an indication, which indicates, for a predetermined media representation, which contains a predetermined temporal layer (e.g. 2 in the figure) among the temporal layers, segments of the predetermined media representation which contain a STSA picture for which, for each higher temporal layer (e.g. 3 in the figure) a picture which firstly follows the STSA picture in decoding order among pictures of the respective higher temporal layer, is of an STSA type, or for each higher temporal layer, a picture which firstly follows the STSA picture in presentation order among pictures of the respective higher temporal layer, is of an STSA type, as stream access points in the predetermined representation; decide, based thereon, which media representation or which sub-representation to download from the server.

According to another embodiment, a method for processing a file may have the steps of: receive the file which has temporal layers, which a video bitstream is hierarchically composed of, inserted into a set of tracks of the file by distributing the temporal layers onto the set of tracks in groups of one or more temporal layers so that each group is inserted into a track associated with the respective group; determine, for a predetermined track of the set of tracks, an indication of a predetermined STSA picture in a lowest temporal layer among the group of one or more temporal layers associated with the predetermined track, for which, for each other temporal layer of the group of one or more temporal layers associated with the predetermined track, a picture which firstly follows the predetermined STSA picture in decoding order among pictures of the respective temporal layer, is of an STSA type, or for each other temporal layer of the group of one or more temporal layers associated with the predetermined track, a picture which firstly follows the predetermined STSA picture in presentation order among pictures of the respective temporal layer, is of an STSA type, and use the predetermined STSA picture in the predetermined track as stream access point.

A first aspect of the invention relies on the idea, that during parsing the file, it is derived from descriptive data within the file, such as a parameter set, whether a parameter set in the file for a predetermined track of the file is to be ignored when decoding a stream which is distributed onto multiple tracks including the predetermined track. According to this aspect, the parameter set of the predetermined track is forwarded together with the stream, which is distributed to the multiple tracks, for decoding if the descriptive data does not indicate that the parameter set for the predetermined track is to be ignored when decoding the stream. If the descriptive data indicates that the parameter set for the predetermined track is to be ignored in the decoding of the stream, the stream, which is distributed over the multiple tracks, is forwarded without the parameter set.

Consequently, the parameter set for the predetermined track which is not required for decoding the stream distributed over the multiple tracks does not need to be handled or decoded in the decoding of the stream comprising the multiple tracks. Therefore, decoding resources may be used more efficiently. For example, less buffer space is needed and computational effort for decoding the unrequired parameter set may be saved.

A second aspect of the invention provides for a file format concept allowing to extract, from a file, a bitstream comprising a sub-picture of the video stream signaled in the file, a region of interest represented by the sub-picture changing dynamically over the sequence of pictures of the video bitstream.

A third aspect of the invention provides for a file format concept, according to which a file comprises a video sequence which allows for extracting, from the file, a video bitstream with a dynamic size. In particular, the concept of the third aspect of the invention allows a file parser to identify non-random access point pictures which allow a decoder to start decoding a track to which the non-random access point picture belongs. Thus, the video bitstream provided to the decoder by the file parser may be extended by an additional track even between two occurrences of random access point pictures. The concept may also provide for a client and a manifest file for streaming scenarios, the manifest file indicating segments which comprise indications for said non-random access point pictures, enabling a client to download a track from said segments onwards. Thus, additional switching points are provided or, alternatively, an unnecessary download of segments in search for an access point may be avoided.

A fourth aspect of the invention provides a file format concept, according to which a file comprises a video sequence, the file indicating a temporal length of an interval after which a decoder refresh over a whole picture area of a video stream is complete, the video stream being represented in the file of at least two sub-streams which may have individual decoder refresh positions and/or decoder refresh cycle lengths.

A fifth aspect of the invention provides a file format concept, including a file, a file parser and a file generator, according to which the file parser derives from information in the file, whether a pixel aspect ratio varies between pictures signaled in the file. As the file parser may detect, on the basis of the information in the file, whether a pixel aspect ratio varies, the file parser may provide a video player, which may playout a sequence of pictures decoded from the file, with the respective information. Thus, the pixel aspect ratio may be varied in the coding of the pictures, what may allow for a higher compression rate. The concept may allow for varying the pixel aspect ratio even without signaling the pixel aspect ratio at sample level. Further, as the file parser may detect a varying pixel aspect ratio, a video decoder decoding a video bitstream provided by the file parser may decode the video bitstream irrespective of the pixel aspect ratio and/or may not be required to decode information about the pixel aspect ratio at sample level.

BRIEF DESCRIPTION OF THE DRAWINGS

Embodiments of the present invention will be detailed subsequently referring to the appended drawings, in which.

DETAILED DESCRIPTION OF THE INVENTION

In the following, embodiments are discussed in detail, however, it should be appreciated that the embodiments provide many applicable concepts that can be embodied in a wide variety of video coding and video streaming. The specific embodiments discussed are merely illustrative of specific ways to implement and use the present concept, and do not limit the scope of the embodiments. In the following description, a plurality of details is set forth to provide a more thorough explanation of embodiments of the disclosure. However, it will be apparent to one skilled in the art that other embodiments may be practiced without these specific details. In other instances, well-known structures and devices are shown in form of a block diagram rather than in detail in order to avoid obscuring examples described herein. In addition, features of the different embodiments described herein may be combined with each other, unless specifically noted otherwise.

In the following description of embodiments, the same or similar elements or elements that have the same functionality are provided with the same reference sign or are identified with the same name, and a repeated description of elements provided with the same reference number or being identified with the same name is typically omitted. Hence, descriptions provided for elements having the same or similar reference numbers or being identified with the same names are mutually exchangeable or may be applied to one another in the different embodiments.

Figure 1:
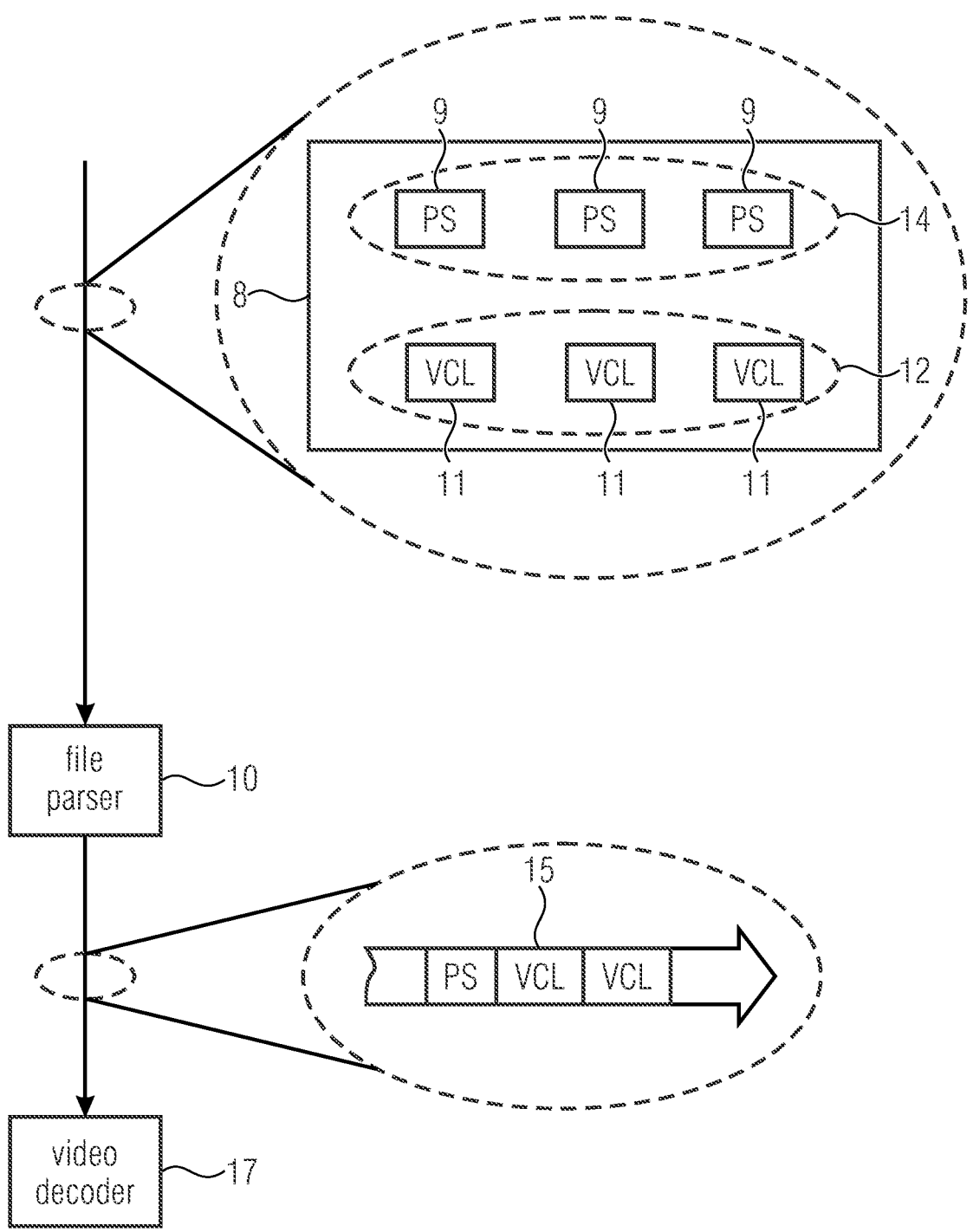
FIG. 1 illustrates an example of a file and a file parser.
Figure 2:
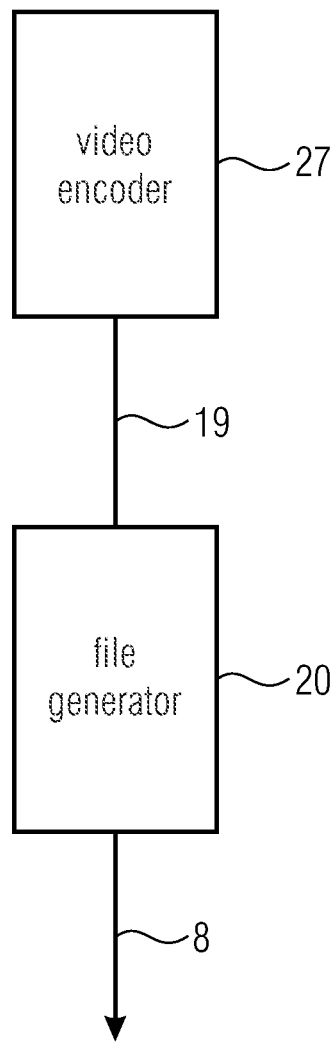
FIG. 2 illustrates an example of a file generator.

The following description of the figures starts, in section 0, with the presentation of a file parser in conjunction with a video decoder, and a file generator in conjunction with a video encoder with respect to FIG. 1 and FIG. 2, respectively. The file parser of FIG. 1 and the file generator of FIG. 2 provide an example for a framework into which embodiments of the present invention may be built in. thereinafter, the description of embodiments of the concept of the present invention is presented along with a description as to how such concepts could be built and to the file parser and the file generator of FIG. 1 and FIG. 2, respectively. Although, the embodiments described with respect to the subsequent FIG. 3 and following may also be used to form a file parser and a file generator not operating according to the framework described with respect to FIG. 1 and FIG. 2.

0. File Parser 10 According to FIG. 1 and File Generator 20 According to FIG. 2

FIG. 1 illustrates an example of a file parser 10 in conjunction with a video decoder 17. The file parser 10 receives a file 8 and generates on the basis of the file 8 a video bitstream 15. The file 8 may also be referred to as video file, file data, file of a video or the like. The video bitstream 15 is provided to the video decoder 17 which decodes the video bitstream 15. The file parser 10 may represent any means receiving the file. The file parser 10 may, for example, be part of a video player, which may also comprise the video decoder. That is, the entity receiving the video bitstream 15 may be video decoder 17 or a video player comprising the latter. In so far the file format parser 10 may, itself, form one entity along with the video decoder 17 and/or the video player and/or an application such as a DASH client or the like. The video bitstream 15 generated by file parser 10 may include all or an excerpt of the content of file 8. For example, the video bitstream 15 may have parameter sets therein in-band or the video bitstream 15 may be accompanied by parameter sets out-of-band.

The file 8 comprises coded video data 12 and further comprises descriptive data 14. The descriptive data 14 may be indicative of a structure of the video data 12, dependencies within the coded video data 12, information for decoding of the video data 12 and/or information for parsing the video data 12. The coded video data 12 may comprise a plurality of samples 11 of the coded video data 12, e.g., a plurality of video coding layer (VCL) network abstraction layer (NAL) units, each of which may comprise a coded picture of coded video sequence or a portion of a coded picture such as a slice or a tile of a coded picture.

Thus, in examples, multiple samples of the coded video data 12 may together comprise a coded picture. In other words, the samples 11 comprise the coded video data 12, i.e. data, into which the residual samples and prediction modes, motion vectors and so froth is actually coded.

The descriptive data 14 may comprise a plurality of parameter sets 9 each of which may comprise one or more parameters. A parameter set 9 may be associated with one of the samples 11 or may be associated with a subset of the plurality of samples of the coded video data 12, or may be associated with the plurality of samples of the coded video data 12. A parameter set 9 may comprise information for the parsing or for the decoding of one or more of the samples 11 to which it is associated. In examples, the parameter set associated to a sample 11 may further be indicative of a further one of the samples 11, which is needed for parsing or decoding of the sample associated with the parameter set. In this case, information indicated by the associated parameter set may also refer to the further sample which is needed for decoding of the sample 11.

The file 8 may comprise one or more tracks, to which the coded video data 12 and the descriptive data 14 may be distributed. For example, the coded video data 12 may be distributed to multiple tracks and each of the tracks to which the coded video data 12 is distributed may comprise parameter sets 9 of the descriptive data 14 which refer to samples of the coded video data 12 contained in the respective track. Although, a parameter set 9 of one of the tracks may further refer to coded video data of a further of the tracks, for example, if the coded video data of the further track is needed for decoding of the coded video data of the respective track and/or if the track, or a sample thereof, references the further track.

For example, a sample 11 may be associated with one of multiple layers of the coded video data 12. By means of selecting one or more of the layers of the coded video data 12, a video bitstream of a specific size, or more general, fulfilling certain constraints and/or requirements, may be extracted from the file 8. Additionally or alternatively, each of the portions of the coded video data 12 may be associated with one of multiple temporal layers. By means of extracting one or more of the temporal layers of the coded video data 12, a frame rate of a video bitstream derived from the coded video data 12 may be selected, thus allowing for adapting bitstream requirements of the obtained video bitstream 15. For example, a track of file 8 may comprise samples 11 associated with a specific layer and/or associated with a specific temporal layer.

Thus, the file 8 may provide several choices for performing a playback based on the coded video data 12 of file 8. In other words, the file 8 may allow for an extraction of one or more sub-streams, each of the sub-streams comprising a portion of the coded video data 12, i.e. a subset of the samples 11. One of the sub-streams may include the entire coded video data 12. For example, a track of file 8 may comprise a sub-stream which may be decoded, i.e. played, independently from other tracks. That is, the track may comprise all samples and parameter sets needed for generating a decodable video bitstream 15. Other examples of tracks may comprise a sub-stream of the coded video data 12 which is not decodable independently from other tracks. For example, a sub-stream of a track (e.g. the sub-stream is defined by a parameter set of the track, e.g. by indicating samples belonging to or needed by the subs-stream, e.g. by referencing one or more layers and/or one or more temporal layers) may depend on a further track, as it may involve samples 11 of the further track. Also, a sub-stream of the coded video data 12 may include multiple tracks which may both comprise or define independent sub-streams themselves. A generation of the video bitstream 15 based on multiple tracks may be referred to as joint decoding of the respective tracks or sub-streams. In other words, the "joint decoding" may be one of several choices to perform a playback based on the file 8. It is noted that a further choice might be a playout of one or more sub-tracks of track only. That is, a portion of the samples 11 of a track may form a sub-stream on their own. The decision among the choices for playback of the coded video data 12 may be provided to the file parser 10 from external means such as the video decoder 17 or a video player or some application, or might even be made by the file parser 10 itself, and the file parser 10 may provide the video bitstream 15 accordingly. For example, the file parser 10 may select the sub-stream on the basis of an operation point which is indicative of capabilities of the video decoder 17. Thus, file parser 10 generates video stream 15 by including, into the video stream 15, a set of samples 11 of the coded video data 12 and a set of parameter sets 9 of the descriptive data 14 which is associated with the included samples.

For example, the file parser 10 may provide samples 11 and parameter sets 9 in a decoding order, i.e. in an order needed by decoder 17 for decoding.

FIG. 2 illustrates an example of a file generator 20 in conjunction with the video encoder 27. Video encoder 27 generates a video stream 19, based on which the file generator 20 generates the file 8. The video stream 19 may be similar to the video stream 15, or, in examples, be equal to the video stream 15. In contrast to video stream 19, the video stream 15 of FIG. 1 may, for example, include only a portion of the coded video data 12 of file 8, while the video stream 19 may comprise the entire coded video data of file 8.

For example, file parser 10 and file generator 20 may use a concept such as file format, e.g., ISO base media file format (ISOBMFF), for parsing and generating file 8, respectively.

Versatile Video Coding (VVC) includes some new functionalities that might involve special handling in the ISOBMFF. These functionalities include:

Sub-pictures: sub-pictures are regions in a picture for which their boundaries are treated as if they were picture boundaries, e.g. prediction of temporal motion vectors is done using the collocated motion vector in the reference picture instead of the right-bottom collocated motion vector or motion compensation is done by using only sample of the same sub-picture and if motion vectors point to sample locations outside the sub-picture region, a boundary extension by sample padding is done as if it was the picture boundary. Such a functionality is very useful for 360 video or RoI.

Scalable bitstreams: as for previous video coding standards VVC specifies scalable bitstreams. In this case, the profiling does not distinguish between scalable and non-scalable. Any decoder can decode a scalable bitstream as long as the complexity involved therewith is the same as if the bitstream was not scalable.

Gradual Decoding Refresh (GDR): this allows for avoiding IDRs or CRAs random access points that generate peaks in the size of the AUs of those RAPs. Instead GDR AUs are present in the bitstream that spread the "refresh" of a picture across several pictures and when all those pictures are processed a stream can be accessed equivalent to as if a RAPs was present in the bitstream.

Reference Picture Resampling (RPR): Reference picture resampling consists on allowing different picture sizes to be present in the bitstream and allowing temporal prediction from a reference picture that has a different size. As a result, the reference picture needs to be resampled so that the prediction for the current picture can be carried out.

WC defines AU that have mixed NAL unit types. The reason behind is that in some scenarios there might be multiple bitstreams that are merged together into a single bitstream that a decoder decodes and in such cases it might not be possible to synchronize all NAL unit types in time across several bitstreams. Therefore, in a merged bitstream there might be AUs with mixed NAL unit types.

There are two aspects of RoI that are considered in this document. How to store and process a RoI that is static in the ISOBMFF (see section 1) and how to have dynamic RoI using a multilayer bitstream (see section 2).

When the coding structure of a bitstream allows for temporal scalability, one use-case in mind is to allow adaptation to the current network throughput by decoding only a subset of temporal layers. Therefore, section 3 covers different aspects regarding when temporal layers are separated into tracks and switching from one track to another track of a temporally scalable bitstream.

Section 4 covers different aspects of Gradual Decoder Refresh where a the bitstream data is distributed over multiple tracks.

While RPR brings several benefits in terms of allowing bitrate adaptation and open GOP resolution switch, it has the drawback that the pixel aspect ratio might change over time. Section 5, deals with the particular solutions to solve this problem.

It is pointed out, that, in the following, various embodiments of file generator 20, file parser and file 8 are provided, which may be implemented independently of each other. Each of the described embodiments of file parser 10 is to be understood as a description of a corresponding file generator 20 and vice versa, wherein the described features of file generator 20 and the file parser 10 may be exchanged between each other according to the relation between the file parser 10 and the file generator 20 as described with respect to FIGS. 1 and 2.

1. File Parser 10, File Generator 20, and File 8 According to FIG. 3 to FIG. 13

Figure 3:
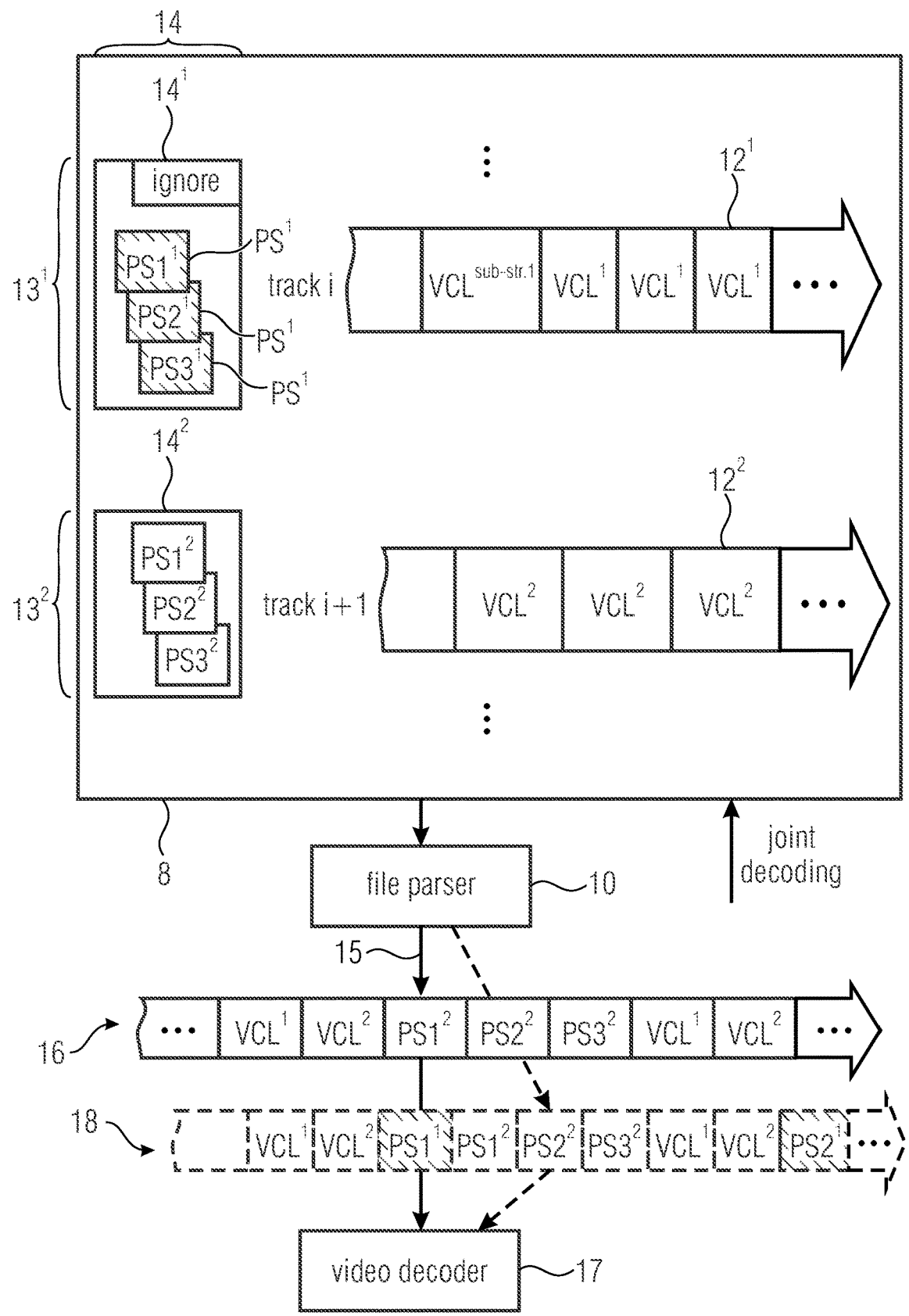
FIG. 3 illustrates an example of a file and a file parser according to the first aspect.

FIG. 3 illustrates an embodiment of a file format parser 10 according to the first aspect. The file format parser 10 of FIG. 3 may optionally correspond to the file parser 10 of FIG. 1. The file format parser 10 may, for example, be defined in terms of its specific manner to deal with video bitstreams having sub-streams thereof distributed onto more than one track. The file format parser 10 may collect sub-streams from several tracks for joint decoding, i.e., to provide the video bitstream 15 (cf. FIG. 1, represented by video bitstream 16 or video bitstream 18 in FIG. 3) comprising the collected sub-streams from the several tracks. The file format parser 10 is configured for receiving a file 8, which may correspond to the file 8 of FIG. 1. According to the embodiment of FIG. 3, the file 8 contains a set of tracks, for example, a track group. In FIG. 3, the set of tracks exemplarily comprises a track $13^1$, also referred to as track i, or the predetermined track, and a further track $13^2$, also referred to as track i+1 For example, the track $13^1$ and the further track $13^2$ are part of the same track group. Sub-streams of a video bitstream are distributed onto the set of tracks contained in the file 8. As explained with respect to FIG. 1, a sub-stream may be any sub-collection of NAL units of the video bitstream such as a sub-stream having a certain sub-picture encoded therein, i.e., a sub-stream having encoded there into a sequence of sub-pictures of a sequence of pictures encoded into the video bitstream. For example, each picture encoded into the video bitstream may be partitioned into sub-pictures, with collocated sub-pictures being coded in such a sub-steam independent from the encoding of offset collocated sub-pictures into another sub-bitstream. referring to FIG. 3, the track $13^1$ comprises coded video data $12^1$, the coded video data $12^1$ comprising a set of VCL NAL units referred to as $VCL^1$. It is pointed out, that VCL NAL units are representative of samples 11 as explained with respect to FIG. 1. Although the description herein is conducted by the example of NAL units, the herein described concept is not limited thereto but rather allows for usage of other sample structures. Same holds for the other sections of the description. The track $13^1$ further comprises descriptive data $14^1$, the descriptive data $14^1$ of track $13^1$ comprising one or more parameter sets $PS^1$, represented in FIG. 3 by parameter sets $PS1^1$, $PS2^1$ and $PS3^1$. The descriptive data $14^1$ and the coded video data $12^1$ may form a sub-stream. Thus, a sub-stream may comprise parameter set NAL units in addition to VCL NAL units into which the picture content is actually coded, i.e., in which the residual samples and prediction modes, motion vectors and so forth are coded. It should be noted, that a track or a sub-stream may even exclusively comprise parameter set NAL units, or, to be more precise, may comprise parameter set NAL units without having any of the VCL NAL units. For example, such a track may define a sub-stream by referencing one or more further tracks of file 8. Similar to track $13^1$, track $13^2$ may comprise a set of VCL NAL units, referenced as $VCL^2$, which form coded video data $12^2$ of track $13^2$. Track $13^2$ may further comprise descriptive data $14^2$ which may comprise one or more parameter sets $PS^2$, e.g., parameter sets $PS1^2$, $PS2^2$ and $PS3^2$. Also, track $13^2$ may form a sub-stream, that is, both tracks $13^1$ and $13^2$ may form an individual sub-stream of the video stream of file 8. In examples, the sub-stream of the further track $13^2$ may depend on the track $13^1$. Thus, file format parser 10 may generate video bitstream 15 by combining of the coded video data $12^1$, or a portion thereof, and the coded video data $12^2$ of track $13^2$, or a portion thereof.

In other words, the coded video data 12 and the descriptive data 14 as shown in FIG. 1 may be distributed onto one or more tracks, for example, the predetermined track $13^1$ and the further track $13^2$.

Parameter sets $PS1^1$, $PS2^1$ and $PS3^1$ of the descriptive data $14^1$ may be specific for generating an extracted video bit stream out of the predetermined track $13^1$, for example exclusively using VCL NAL units $VCL^1$. It should be noted, that track $13^1$ may comprise further parameter sets beyond the descriptive data $14^1$. Parameter sets, those of the descriptive data $14^1$ and optionally further parameter sets may be stored in file 8 out-of-band, as illustrated for the case of the descriptive data $14^1$ in FIG. 3, or may alternatively be stored in-band. An in-band parameter set may refer to parameter set which is associated with a VCL, i.e. it is integrated into the temporal order of the VCLs. E.g. the coded video data 12 may comprise samples, which include both VCL NAL units and PS NAL units. In contrast, out-of-band parameter sets of a track may relate to all samples of the track and may be stored separately from the samples. The herein described concept may apply to both types of parameter sets, in-band and out-of-band, as will also be clear from the description of FIGS. 5, 6, 7. That is, parameter sets of the descriptive data $14^1$ may be in-band or out-of-band parameter sets. Similarly, descriptive data $14^2$ of track $13^2$ may be in-band or out-of-band.

According to the embodiment of FIG. 3, the file format parser 10 is configured for inspecting the descriptive data 14, e.g., the descriptive data $14^1$ and/or the descriptive data $14^2$ or further descriptive data (e.g. in-band or out-of-band descriptive data of track $13^1$ or track $13^2$) within the file 8 so as to derive from the inspected descriptive data whether the descriptive data indicates for the predetermined track $13^1$ of the set of tracks, that a parameter set, e.g., parameter sets $PS1^1, PS2^1, PS3^1$, present in the file 8 for the predetermined track $13^1$ is to be ignored when jointly decoding (e.g., in case of joint decoding of) sub-streams distributed onto more than the predetermined track $13^1$ of the set of tracks. The parameter sets, for which the file format parser 10 derives whether they are to be ignored may be referred to as predetermined parameter sets $PS^1$. For example, the file format parser 10 may inspect whether the descriptive data 14 indicates whether the predetermined parameter set is to be ignored when jointly decoding a sub-stream distributed onto track $13^1$ and the further track $13^2$, i.e., jointly decoding a sub-stream provided by track $13^1$ and a sub-stream provided by track $13^2$. As described before, the joint decoding may be one of several choices to perform playback based on the file.

In case the descriptive data 14 indicates for the predetermined track $13^1$ of the set of tracks that the predetermined parameter set is to be ignored when jointly decoding the sub-stream of track $13^1$ with the sub-stream of track $13^2$, the file format parser 10 forwards the sub-streams distributed onto at least the track $13^1$ and the further track $13^2$ to decoding without forwarding the predetermined parameter set $PS^1$. In other words, the file format parser 10 includes the sub-stream of track $13^1$, which sub-stream may include the coded video data $12^1$, or a portion thereof, and optionally one or more parameter sets of the predetermined track $13^1$ different from the predetermined parameter set $PS^1$. An example of a resulting content of bitstream 15 for this case is shown in FIG. 3 and referenced by sign 16. If the descriptive data does not indicate for the predetermined track $13^1$ that the predetermined parameter set is to be ignored when jointly decoding the sub-streams of track $13^1$ and at least the further track $13^2$, the file format parser 10 forwards the predetermined parameter set $PS^1$ along with a sub-stream distributed onto the predetermined track $13^1$ and at least the further track $13^2$. That is, in this case, the file format parser 10 includes the predetermined parameter set $PS^1$ in the video bitstream 15. An example of a resulting content of bitstream 15 for this case is shown in FIG. 3 and referenced by sign 18.

The file format parser 10 may derive whether to ignore the predetermined parameter set $PS^1$ from the predetermined parameter set $PS^1$ itself, or from further descriptive data of the predetermined track $13^1$, or from descriptive data, e.g. the descriptive data $14^2$ of the further track $13^2$, or a combination thereof. For example, as will also be explained later on, the file format parser 10 may derive the decision whether to forward the predetermined parameter set $PS^1$ to the bitstream 15 or not based on a track reference indicated either in the descriptive data $14^2$ of the further track $13^2$ or in descriptive data of the predetermined track $13^1$. In other examples, the descriptive data 14, e.g., the descriptive data $14^1$ of the predetermined track $13^1$, comprises explicit signals which indicate whether to forward, or not, the predetermined parameter set $PS^1$ to the video bitstream 15.

For example, the sub-stream of the predetermined track $13^1$, to which the predetermined parameter set $PS^1$ refers, represents a sequence of sub-pictures of a sequence of pictures which may be coded into file 8.

Figure 4:
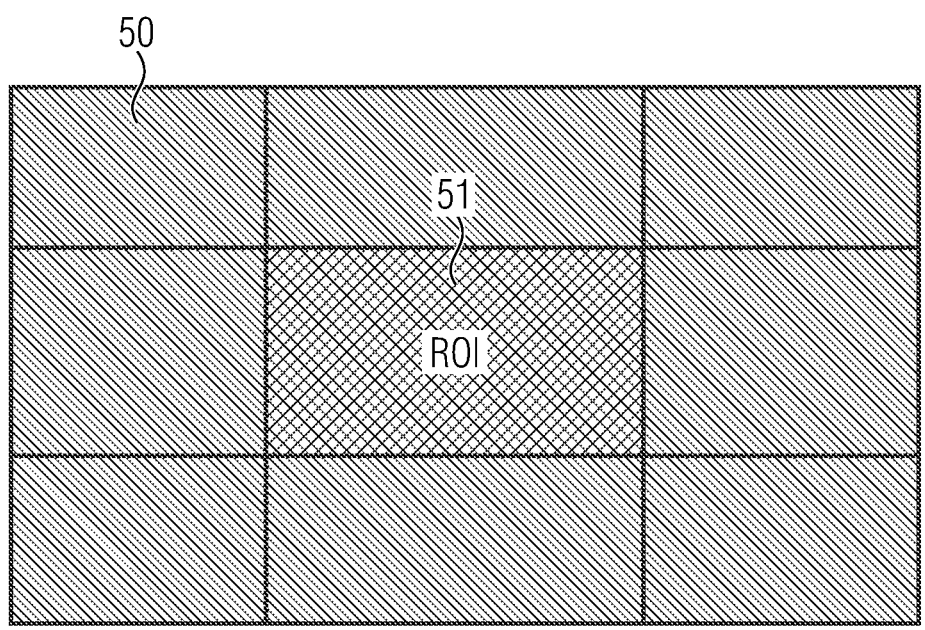
FIG. 4 illustrates an example of a subpicture.

FIG. 4 illustrates an example of a sub-picture 51, also named a region of interest ROI. According to the example of FIG. 4, a picture 50 of the video sequence coded in the file 8 comprises nine tiles of which the middle tile is independently coded, e.g. in track $13^1$ of FIG. 3, and thus, may be extracted as a sub-picture 51, e.g., a ROI sub-picture. In other words, as an example, a picture can have 3×3 grid of VVC tiles where a middle tile for example has a region of interest as shown in FIG. 4. All 9 tiles may be in the same video track/bitstream but the middle one may be an independent sub-picture that can be extracted.

Allowing access to the RoI sub-picture can be done with different approaches:
  1) Multi-track case: Separating the ROI tile into an individual track:
     a. Each tile/sub-picture in a separate track
     b. Joint tracks for non-extractable tiles: first 4 tiles in raster scan in $1^{st}$ track, ROI in $2^{nd}$ track, remaining 4 tiles in raster scan order in $3^{rd}$ track
  2) Single-track case: All tiles in a single joint track When playing back (or decapsulating) a track, the file format parser 10 does not only have to extract the samples within the track but also correctly process parameter sets (e.g. VPS, SPS, PPS, APS). There are different options to store the parameter sets within a file format container. One option is to have in-band parameter sets stored together with the individual samples (i.e. at the time instant they are needed), and another option is to have out-of-band parameter sets in the sample entry (not associated to a time instant). In any case, the file parser 10 may be responsible to hand the parameter sets to the decoder when needed, i.e. if they are present in the sample entry they have to be passed to the decoder at the time instant needed.

When considering the multi-track case 1), the following applies:

As discussed above, when parsing only the track containing the RoI, the parameters included within the RoI track are processed. However, when parsing multiple tracks (that correspond to the larger picture), the respective parameter sets specific to the RoI need to be ignored and instead the parameter sets for the larger picture need to be passed to the decoder.

The reconstruction process of the bitstream for the several tracks case needs to take into account that such a parameter set treatment is needed. Note that for other multi-track use-cases (e.g. layered video with multiple resolutions or qualities, multi-view video), such a treatment is usually not required as layer specific parameter sets are stored within the corresponding track and when parsing the several tracks to reconstruct the multi-layer bitstream all parameter sets are included. However, in the described scenario, the processing is different as follows.

Continuing with the description of FIG. 3, in a first embodiment the file contains signaling, either through a sample entry type or a flag/syntax in the sample entry that indicates that the parameter sets of a sample entry or sample are to be ignored (i.e. skipped and not passed to the decoder) when reconstructing a bitstream from more than one track (as opposed to reconstructing a bitstream from a single track only). In other words, the file format parser 10 may derive the descriptive data from a sample entry of the predetermined track. For example, the file format parser 10 may perform the inspection based on a type of the sample entry (e.g. a sample entry comprises a type index) or based on a syntax element (e.g. flag) within a sample entry of the predetermined track. One such instance of the first embodiment, where a bitstream is reconstructed from more than one track is the case where tracks of a common track_group_id, or only a subset of active tracks of the track group is played (i.e. is forwarded to decoder). For example, the set of tracks to form the set of tracks are indicated to be linked by having assigned a common track group ID to the tracks of the set of tracks.

In one embodiment, this signaling only applies when there are no in-band parameter sets or the presence of in-band parameter sets is forbidden when the signaling is present. For example, the file format parser 10 may suppress the inspection and infer that the parameter set present in the file for the predetermined track is not to be ignored when jointly decoding the sub-streams distributed onto the set of tracks, if the predetermined track comprises at least one in-band parameter set.

In another embodiment, such signaling is specific to in-band and out-of-band parameter sets, so that parameter sets that are to be ignored could be put in one or the other, while the remaining parameter sets are unaffected from the special handling. Such embodiments are described with respect to FIGS. 5, 6, and 7.

The predetermined parameter set $PS^1$ about which the file parser 10 is to decide whether to forward it, is in FIG. 3, illustrated to be out-of-band. That is, the parameter sets of the respective descriptive data may be not time aligned with or integrated to the sequence of VCL NAL units of the coded picture data 12. However, it is pointed out, that the above provided description of FIG. 3 is not limited to out-of-band parameter sets. Rather, the same scheme, that is, the decision about whether to include the predetermined parameter set $PS^1$ to the video stream 15, may additionally or alternatively apply to a parameter set which is in-band, that is, which is associated with a specific VCL of the coded video data 12 with which it is time-aligned. In some embodiments, the decision of the file format parser 10 whether to forward a parameter set of the descriptive data of the predetermined track $13^1$ may refer to all in-band parameter sets or, alternatively, to all out-of-band parameter sets.

Figure 5:
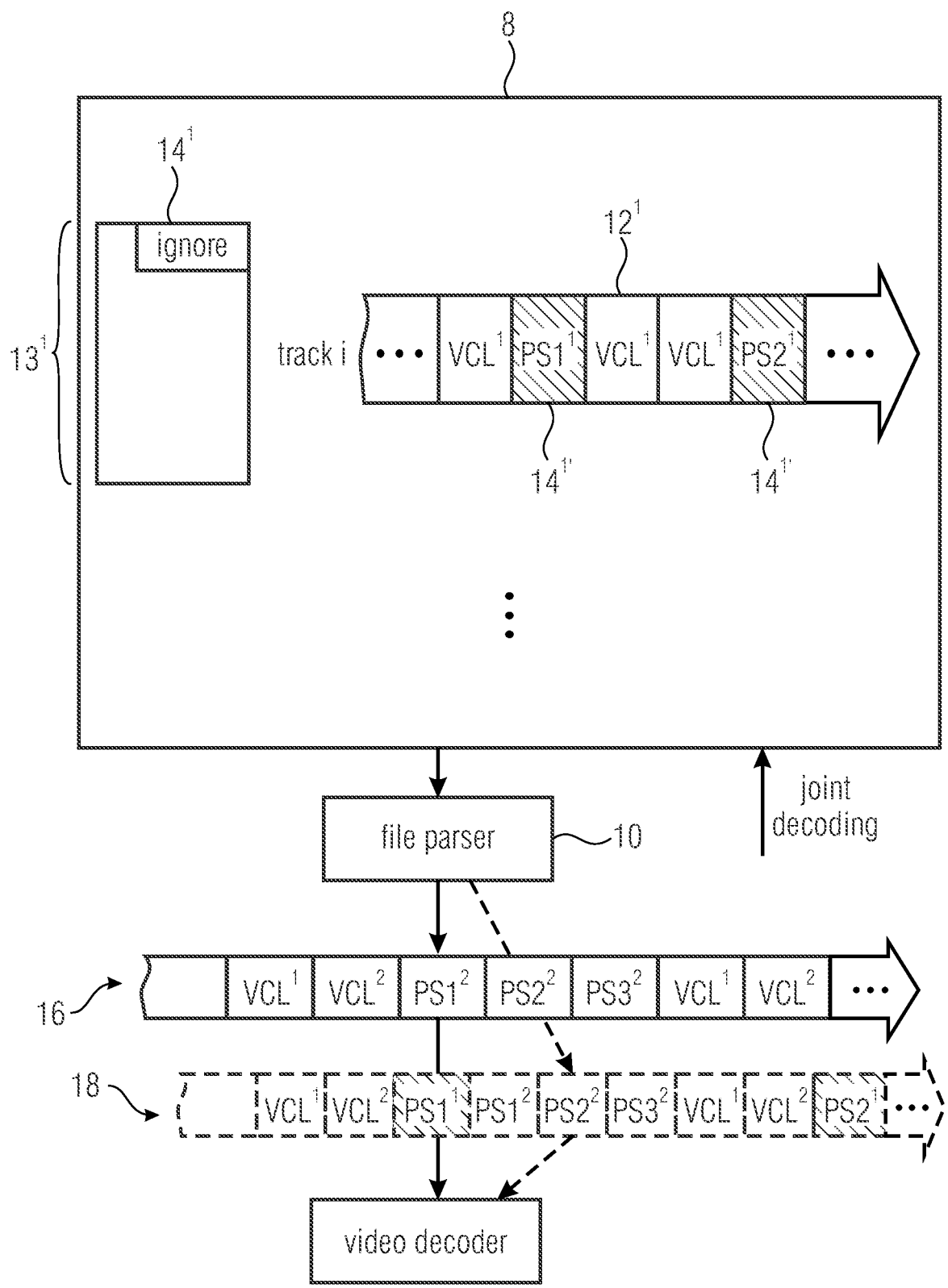
FIG. 5 illustrates another example of a file and a file parser according to the first aspect.

FIG. 5 illustrates an example of the file format parser 10 of FIG. 3. According to the example of FIG. 5, the predetermined track $13^1$ comprises in-band descriptive data $14^{1'}$ integrated to the sequence of VCL NAL units together with the coded video data $12^1$. According to the example of FIG. 5, the predetermined parameter set $PS^1$ is part of the in-band descriptive data $14^{1'}$. According to the example of FIG. 5, the file format parser 10 forwards in-band descriptive data $14^{1'}$ independently of the outcome of the inspection whether to include the predetermined parameter set $PS^1$ into the video stream, but selectively forwards parameter sets of out-of-band descriptive data $14^1$ in dependence on the outcome of the inspection. It is noted, that FIG. 5 is based on FIG. 3 and only illustrates differences with respect to FIG. 3. The further track $13^2$, although it may also present in the scenario shown in FIG. 5, is not shown in FIG. 5.

Figure 6:
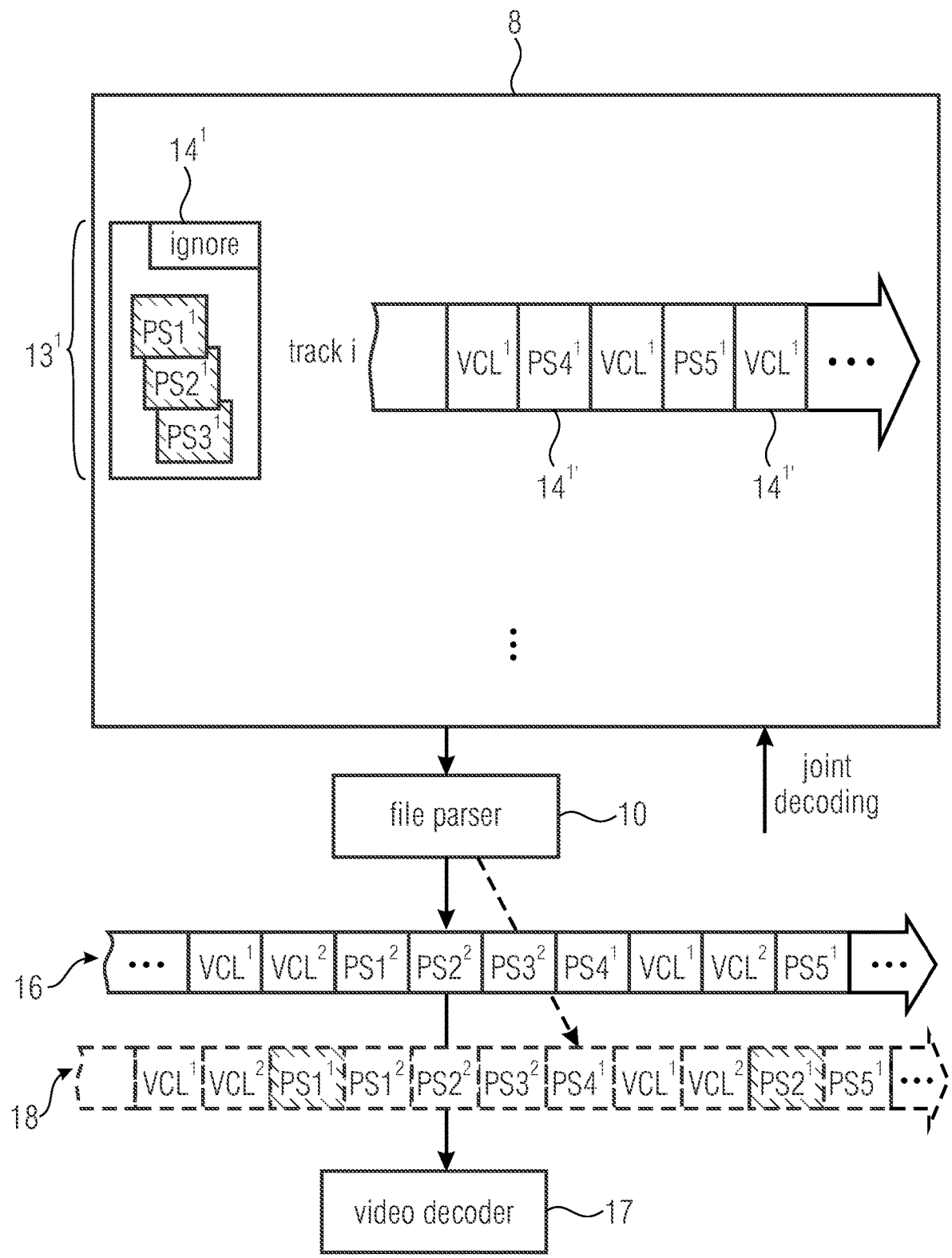
FIG. 6 illustrates another example of a file and a file parser according to the first aspect.

FIG. 6 illustrates another scenario for the file format parser 10 of FIG. 3 and FIG. 5, in particular, following the scenario of FIG. 5. That is, file format parser 10 of FIG. 6 may be configured as described with respect to FIG. 5. FIG. 6 illustrates a scenario, in which the out-of-band descriptive data $14^1$ comprises parameter sets $PS1^1$, $PS2^1$, $PS3^1$. In dependence on the descriptive data of the file 8, the file format parser 10 either forwards the parameter sets of the out-of-band descriptive data $14^1$, as illustrated by means of the video bitstream 18, or alternatively does not forward the parameter sets of the out-of-band descriptive data $14^1$, as illustrated by means of the video bitstream 16. In contrast, in both cases, file format parser 10 forwards in-band descriptive data, that is the parameter sets $PS4^1$, $PS5^1$.

Figure 7:
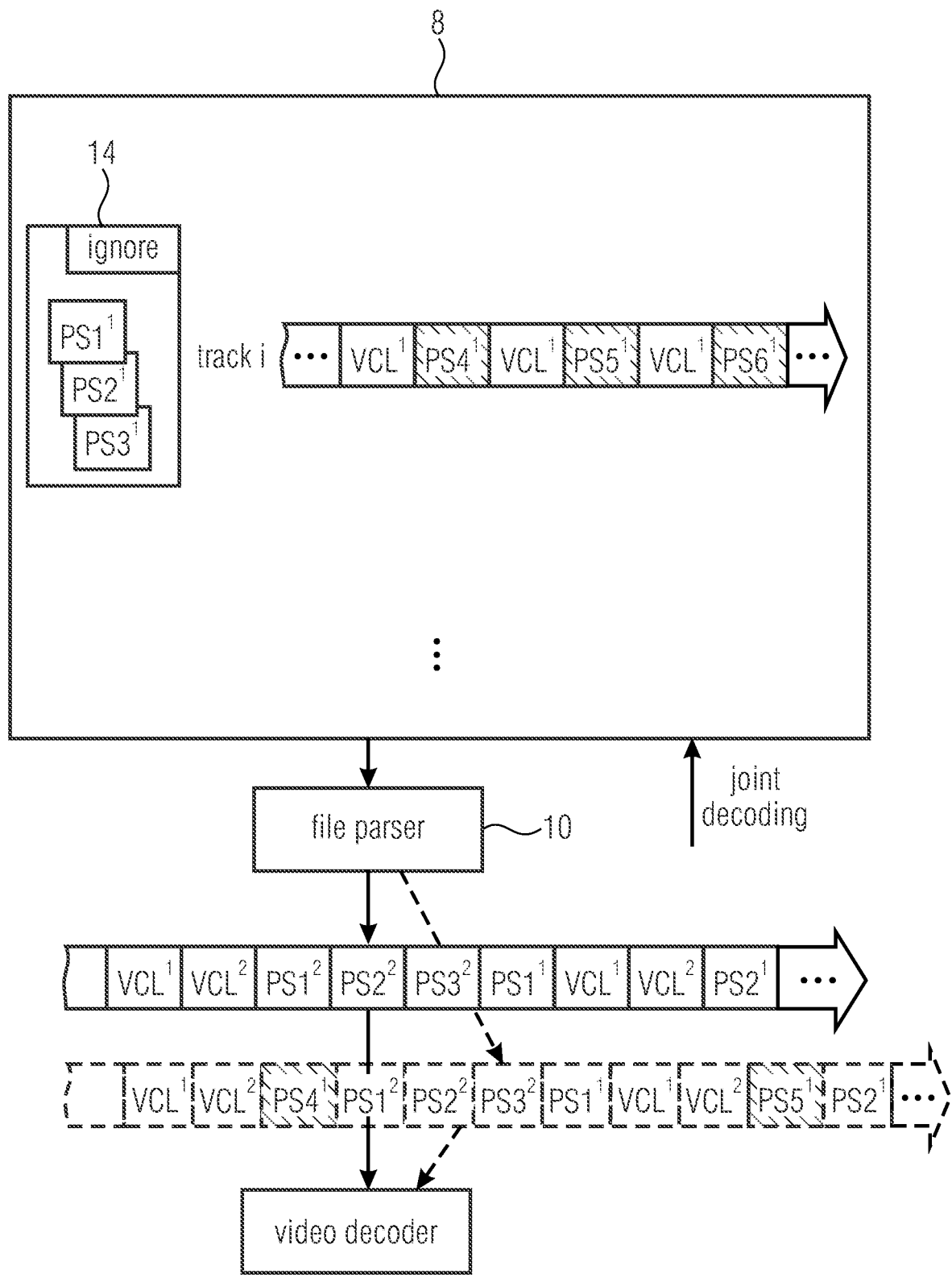
FIG. 7 illustrates another example of a file and a file parser according to the first aspect.

FIG. 7 illustrates another scenario following the embodiment of the file format parser 10 of FIG. 5 and FIG. 6. In contrast to the file format parser 10 of FIG. 6, the file format parser 10 of FIG. 7 selectively forwards the in-band descriptive data $14^{1'}$, namely the parameter sets $PS4^1$, $PS5^1$, $PS6^1$, in dependence on the outcome of this inspection of the descriptive data of the file 8. Further, file format parser 10 of FIG. 7 forwards parameter sets of the out-of-band descriptive data $14^1$ independently of the outcome of the inspection of the descriptive data of file 8.

Figure 8:
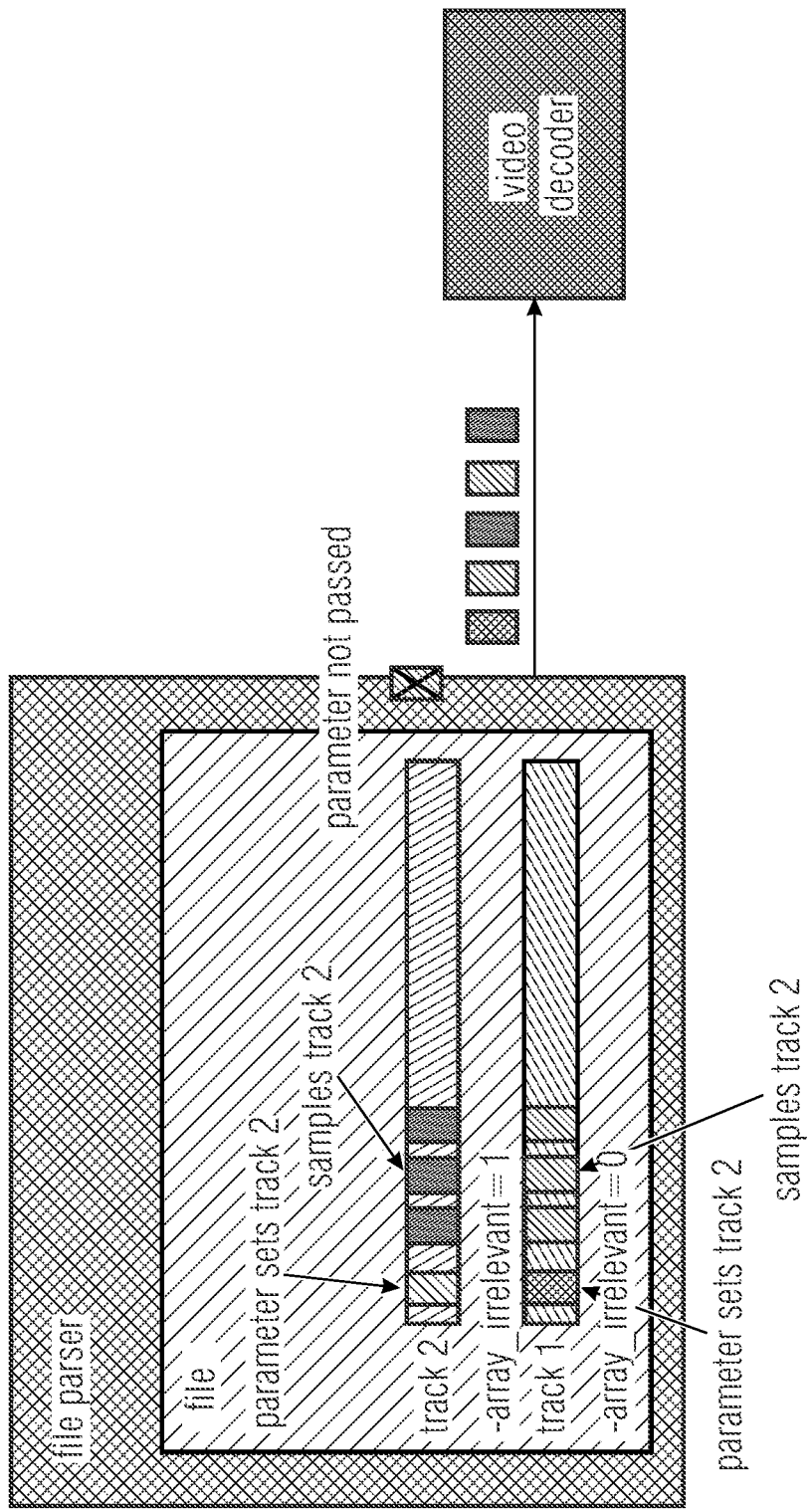
FIG. 8 illustrates another example of a file and a file parser according to the first aspect.

FIG. 8 illustrates another example of the file format parser 10. According to the embodiment of FIG. 8, the file 8 comprises a specific signaling to each of the defined parameter sets (VPS, SPS, PPS, APS) as some of them may have a sub-picture scope, i.e. apply only to a region of a picture and therefore should be kept (forwarded to the decoder) when reconstructing a bitstream from multiple tracks. This is shown in the following as a syntax in the VVCDecoderConfigurationRecord in the sample entry (see array_irrelevant).

```
aligned (8) class VvcDecoderConfigurationRecord {
    unsigned int (8) configurationVersion = 1;
    unsigned int (7) general_profile_idc;
    unsigned int (1) general_tier_flag;
    unsigned int (24) general_sub_profile_idc;
    unsigned int (8) num_bytes_constraint_info;
    unsigned int (8*num_bytes_constraint_info) general_constraint_info;
    unsigned int (8) general_level_idc;
    bit (6) reserved = '111111'b;
    unsigned int (2) chroma_format_idc;
    bit (5) reserved = '11111'b;
    unsigned int (3) bit_depth_luma_minus8;
    bit (5) reserved = '11111'b;
    unsigned int (3) bit_depth_chroma_minus8;
    unsigned int (16) avgFrameRate;
    unsigned int (2) constantFrameRate;
    unsigned int (3) numTemporalLayers ;
    unsigned int (2) lengthSizeMinusOne;
    unsigned int (8) numOfArrays ;
    for (j=0; j < numOfArrays; j++) {
        unsigned int (1) array_completeness;
        unsigned int (1) array_irrelevant;
        unsigned int (6) NAL_unit_type;
        unsigned int (16) numNalus ;
        for (i=0; i< numNalus; i++) {
            unsigned int (16) nalUnitLength;
            bit (8*nalUnitLength) nalUnit;
        }
    }
}
```

I.e., it indicates that NAL units of a given type in the sample entry are not necessary, i.e. to be omitted or ignored (not passed to the decoder), when the stream is not result of parsing uniquely the given track (e.g., array_irrelevant: irrelevant when more than one track is needed for extracting a stream). FIG. 8 illustrates an example on how such a mechanism would work.

Figure 9:
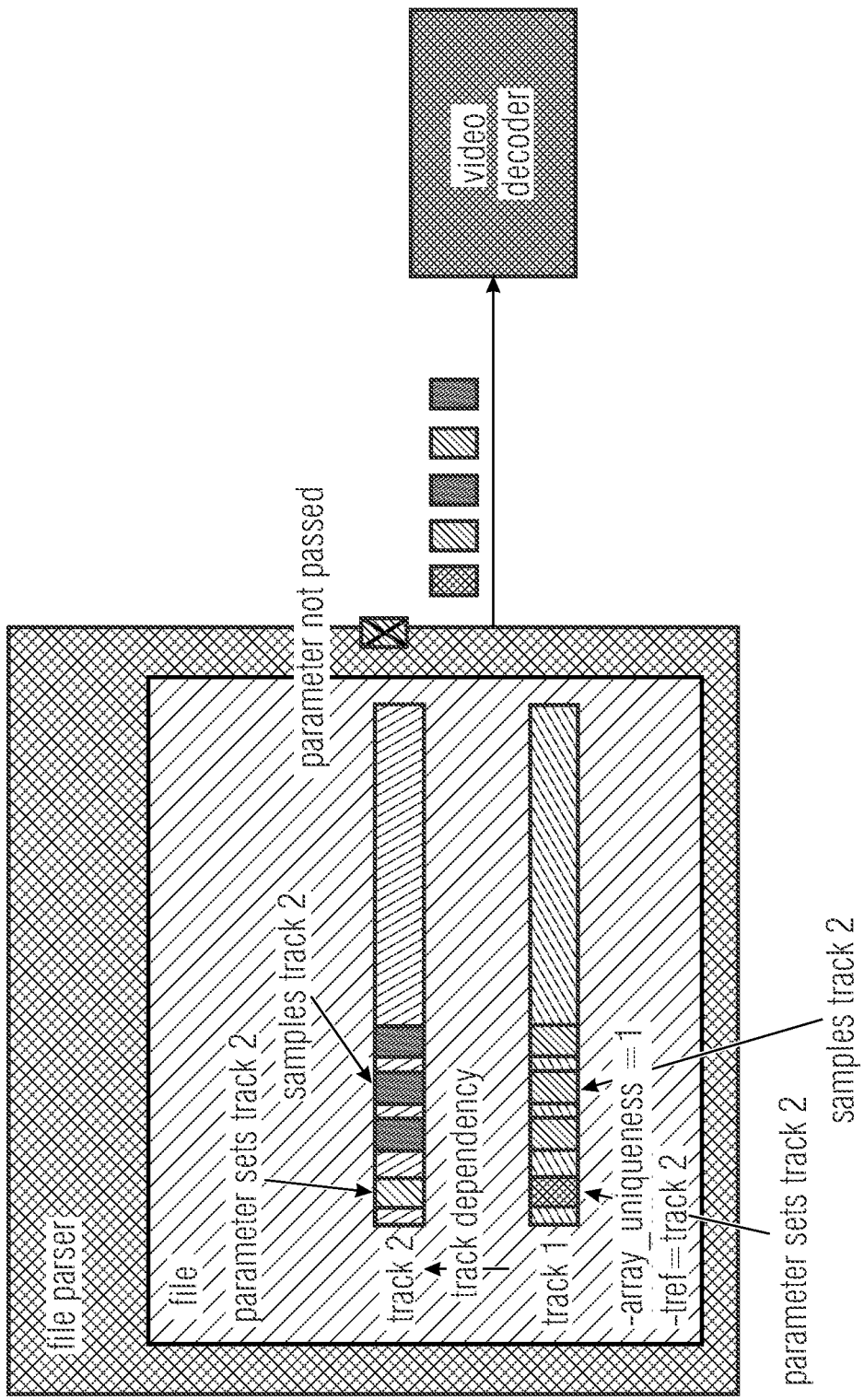
FIG. 9 illustrates another example of a file and a file parser according to the first aspect.

FIG. 9 illustrates a further embodiment of the file format parser 10 of FIG. 3, according to which the file format parser 10 derives the decision whether to forward the parameter set for the predetermined track or not on the basis of a parameter set of file 8, which parameter set is to be forwarded for the currently decoded video stream 15.

In other words, instead of being the tracks containing the irrelevant parameters the ones that indicate whether the parameter sets are ignored, this could be signaled in the parameters containing the parameter sets that are definitely kept. Imagine for instance two tracks as in the figure shown above. Track 2 contains the RoI and can be played alone with the parameter sets within its sample entry for instance. Track 1 could needed. However, the configuration record in the sample entry of track 1 could indicate whether further parameter sets from track 2 are needed or not. That is, the file format parser 10 may derive the descriptive data for the inspection from a sample entry of a further predetermined track $13^2$ of the set of tracks which is dependent on the predetermined track $13^1$.

An example of how syntax in the sample entry would look like is shown in the following:

```
aligned (8) class VvcDecoderConfigurationRecord {
  unsigned int (8) configurationVersion = 1;
  unsigned int (7) general_profile_idc;
  unsigned int (1) general_tier_flag;
  unsigned int (24) general_sub_profile_idc;
  unsigned int (8) num_bytes_constraint_info;
  unsigned int (8*num_bytes_constraint_info) general_constraint_info;
  unsigned int (8) general_level_idc;
  bit (6) reserved = '111111'b;
  unsigned int (2) chroma_format_idc;
  bit (5) reserved = '11111'b;
  unsigned int (3) bit_depth_luma_minus8;
  bit (5) reserved = '11111'b;
  unsigned int (3) bit_depth_chroma_minus8 ;
  unsigned int (16) avgFrameRate;
  unsigned int (2) constantFrameRate;
  unsigned int (3) numTemporalLayers;
  unsigned int (2) lengthSizeMinusOne;
  unsigned int (8) numOfArrays ;
  for (j=0; j < numOfArrays; j++) {
    unsigned int (1) array_completeness;
    unsigned int (1) array_uniqueness;
    unsigned int (6) NAL_unit_type;
    unsigned int (16) numNalus;
    for (i=0; i< numNalus; i++) {
      unsigned int (16) nalUnitLength;
      bit (8*nalUnitLength) nalUnit;
    }
  }
}
``` wherein array_completeness when equal to 1 indicates that all NAL units of the given type are in the following array and none are in the stream; when equal to 0 indicates that additional NAL units of the indicated type may be in the stream; the default and permitted values are constrained by the sample entry name.

array_uniqueness equal to 1 indicates that all NAL units of the given type in the following array suffice for the stream and no other NAL units of the same type in another sample entry of another track are needed for decoding the stream [so that they need to be prevented from being forwarded to the decoder]. When equal to 0 indicates that NAL units of the same type in another sample entry of another track, if present, are needed for decoding the stream.

Continuing with the description of FIG. 3, according to another embodiment, certain parameter set types (VPS, SPS, PPS) may be prohibited (such as for the file generator) as in-band versions while other may be allowed (APS) in a track through means of an indication, e.g. with a flag in or a type of the sample entry. E.g., as a consequence for the file parser, here, the file parser will not have to differentiate sample data NAL units (ignore or not) as all samples are forwarded and will only have to treat the out-of-band parameter sets accordingly.

That is, the file format parser 10 may derive from the descriptive data 14 information whether no in-band parameter set is present in the file for the predetermined track. Alternatively, the file format parser 10 may derive from the descriptive data 14 information whether for the predetermined track $13^1$ in the file 8 only parameter sets of a first set of one or more parameter set types are present in-band within the one or more sub-streams contained by the predetermined block $13^1$, while the parameter set is contained in one or more boxes of the file and is of a parameter set type comprised by a second set of one or more parameter set types which is disjoint to the first set.

Continuing with the description of FIG. 3, as described above, the file format parser may derive the descriptive data for the inspection from a parameter or a parameter set which indicates a track reference or a track dependency. For example, the descriptive data $14^2$ of the further track $13^2$ may comprise a track reference which indicates, that the coded video data $12^2$ of track $13^2$ depends on the coded video data $12^1$ of the predetermined track $13^1$. For example, the parameter or parameter set indicating the track reference may be in-band or out-of-band. That is, parameter set indicating the track reference may be stored in a separate parameter box, such as illustrated in FIG. 3, or may alternatively be indicated in a sample or sample entry of the $VCL^2$ of the coded picture data $12^2$. In further examples, the file 8 comprises a further predetermined track which may optionally be a non-VCL track (that is, the further predetermined track does not comprise coded video data, VCL NAL units), but may comprise parameter set NAL units, i.e., one or more parameter sets, which may define a sub-stream by referencing one or more other tracks of the file 8, for example, the predetermined track $13^1$ and the further track $13^2$. An example of such an implementation with a further predetermined track is illustrated in FIG. 10.

Figure 10:
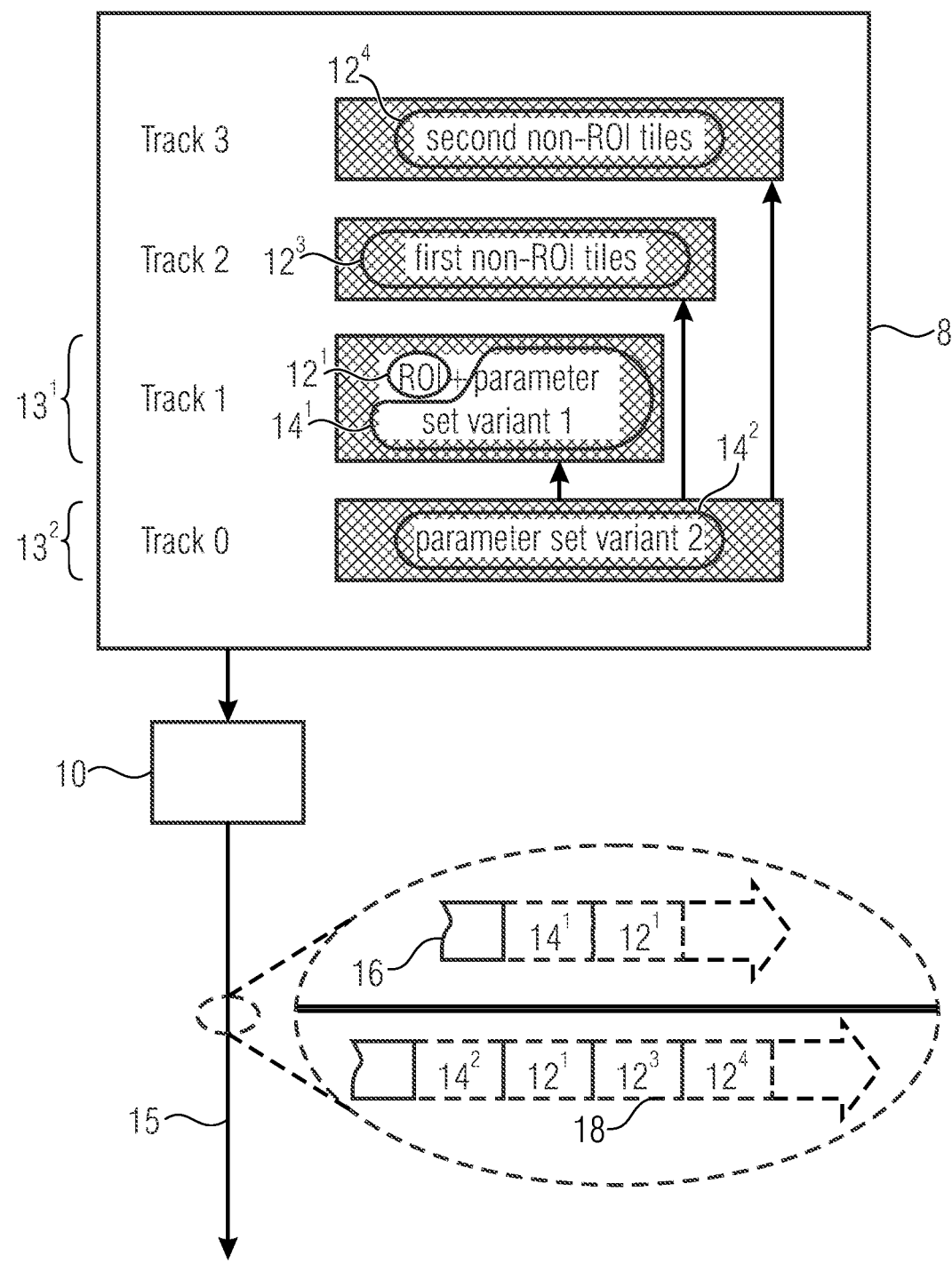
FIG. 10 illustrates another example of a file and a file parser according to the first aspect.

FIG. 10 illustrates another example of the file format parser 10 which may optionally correspond to the file format parser 10 of FIG. 1 and/or the file format parser 10 of FIG. 3. According to FIG. 10, file 8 comprises the predetermined track $13^1$ comprising coded video data $12^1$ of a sub-picture, for example, the region of interest shown in FIG. 4. The predetermined track $13^1$ further comprises descriptive data $14^1$ comprising one or more parameter sets (the predetermined parameter set $PS^1$ as explained with respect to FIG. 3), so that track 1 when extracted from the file independently from other tracks, cf. bitstream 16 of FIG. 10, may be decoded by decoder 17. That is, file format parser 10 may forward exclusively the predetermined track $13^1$ (track 1), for example, if a specific operation point is selected. According to FIG. 10, the file 8 further comprises further tracks, namely track 2 and track 3. Track 2 and track 3 comprise coded video data $12^3$ and $12^4$, respectively, which may be representative of sub-pictures of a coded picture coded into file 8, the sub-pictures of the further tracks being optionally complementary to the sub-picture represented by the coded video data $12^1$ of the predetermined track. According to FIG. 10, the file 8 further comprises a further predetermined track $13^2$, also named track 0. The further predetermined track $13^2$ comprises a parameter set $14^2$ for a sub-stream comprising the sub-picture of track 1 as well as the sub-pictures of the one or more further tracks, e.g., track 2 and/or track 3. In other words, the parameter set of the further predetermined track $13^2$ may reference the predetermined track, track 1, and one or more of the further tracks, track 2 and/or track 3, indicating that the coded video data, or a portion thereof, of the predetermined track and one or more of the further tracks is part of the sub-stream described by the further predetermined track, track 0. In case of extracting the sub-stream described by the further predetermined track $13^2$, that is, in case of a joint decoding of the predetermined track $13^1$, track 1 and one or more of the further tracks, track 2 and/or track 3, one or more or all of the parameter sets of the predetermined track $13^1$, track 1, may be irrelevant, i.e. may be unnecessary for decoding the selected video bitstream. Thus, in case that the file format parser 10 generates the video stream 15 so that the video stream 15 comprises the sub-stream described by the further predetermined track $13^2$, track 0, file format parser 10 may omit one or more or all of the parameter sets of the predetermined track $13^1$ in the generation of the video bit stream 15. For example, in the finding, that track 0 comprises a parameter set or a parameter or a parameter set box indicating a track reference of the further predetermined track, track 0 on the predetermined track, track 1, the file format parser 10 may forward the coded picture data $12^1$ of the predetermined track $13^1$ in the video stream 15 without forwarding one or more or all of the parameter sets $14^1$ of the predetermined track $13^1$, cf. bitstream 18. For example, the track reference in the further predetermined track referencing the predetermined track may be a sub-picture reference, indicating, that the coded picture data of the predetermined track comprises a sub-picture which is to be included in the video stream 15.

In other words, the file format parser 10 may derive the descriptive data from a track dependency box which, in addition to indicating whether the parameter set present in the file 8 for the predetermined track $13^1$ are to be ignored when jointly decoding the sub-streams distributed onto the set of tracks, indicates, for a further predetermined track $13^2$, track 0, of the set of tracks, a dependency on the predetermined track $13^1$.

In other words, according to an embodiment, Parameter Sets in a track are ignored by means of a track reference type. Track references are given by a box that points to referenced tracks by the track identifiers, for example, as follows:

```
aligned (8) class TrackReferenceBox
extends Box ('tref') {
}
aligned (8) class TrackReferenceTypeBox
(unsigned int (32) reference_type)
extends Box (reference_type) {
    unsigned int (32) track_IDs [ ] ;
}
```

This box provides a reference from the containing track to another track in the presentation. These references are typed. For instance, a 'scal' reference type is used to express the multiplexing of NAL units from the involved tracks to form an access unit of the bitstream. Now, consider the example given in FIG. 4 and a track assignment as illustrated in FIG. 10 where Track 1 represents the ROI in a self-contained fashion (e.g. contains a conformant bitstream with all needed VCL (slices) and non-VCL data (parameter sets variant 1)). Track 0 contains the parameter set variant needed for decoding the whole video (ROI+non-ROI) and Track 2 and 3 contain the non-ROI tiles of the example without parameter set data, thereby representing case 1b) with joint tracks for the non-ROI tiles where possible. Track 0 uses track references to reference Track 1 to 3, i.e. all slice data of the whole picture bitstream. However, as part of the invention, in this embodiment, a special track reference type 'ovcl' indicates that only VCL data of the reference tracks is to be played (multiplexed in forming an access unit similar as the 'scal' reference type) and non-VCL data (e.g. parameter sets) are to be ignored when reconstructing the bitstream. In another embodiment, a flag in the track reference signaling is used to indicate that a player playing Track 0 ignores the Parameter Sets stored in Track 1.

Figure 11:
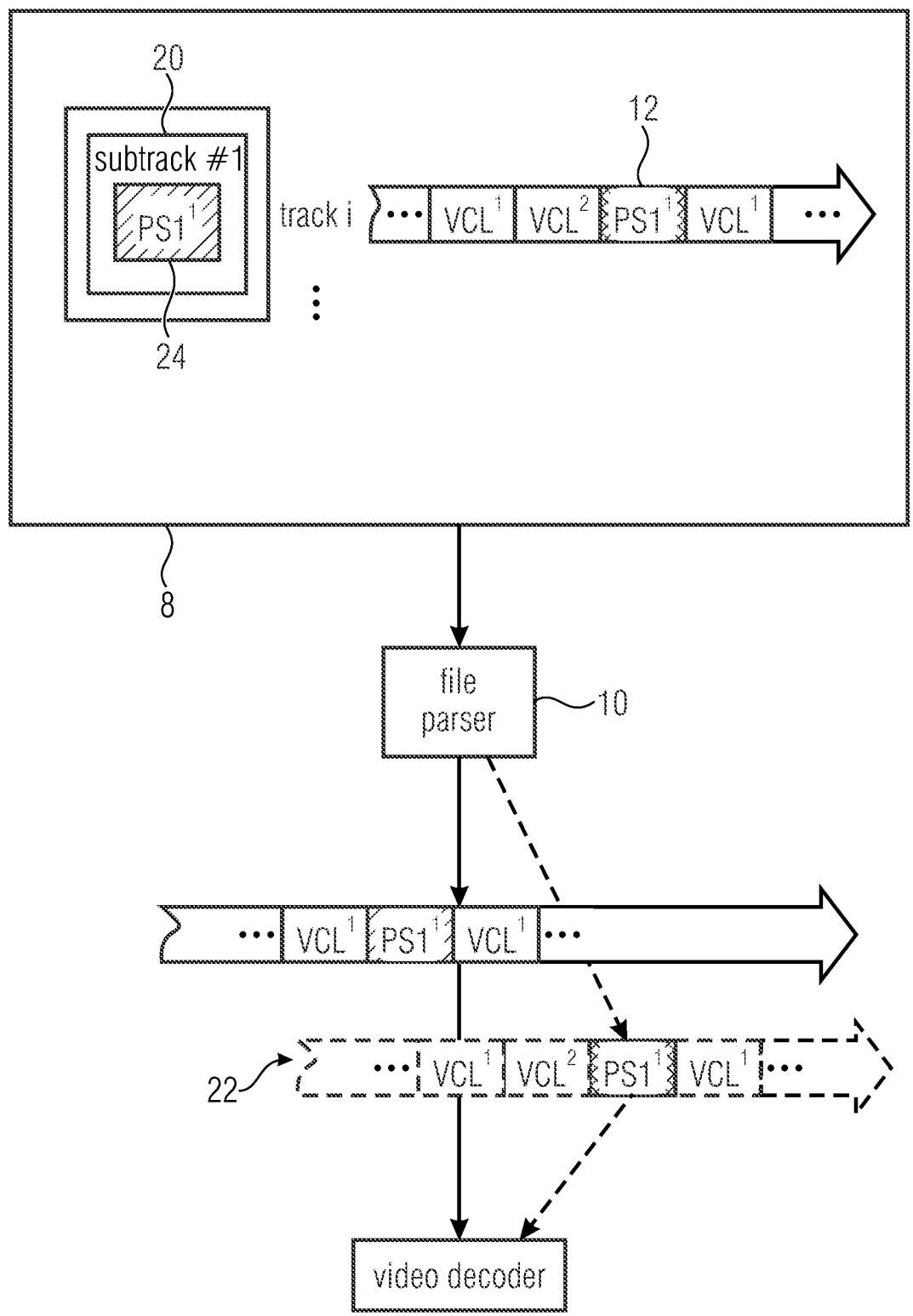
FIG. 11 illustrates an example of a file and a file parser according to the first aspect for single-track scenarios.

FIG. 11 illustrates another example of the file format parser 10 of FIG. 1, which may implement the concept of the file format parser 10 of FIG. 3 of selectively forwarding a parameter set of a track for the case of a single track, i.e., for the case that the file 8 comprises a single track, and that sub-streams of the coded video data 12 represented by file 8 may be extracted by extracting one or more track portions out of the single track of file 8.

Figure 12:
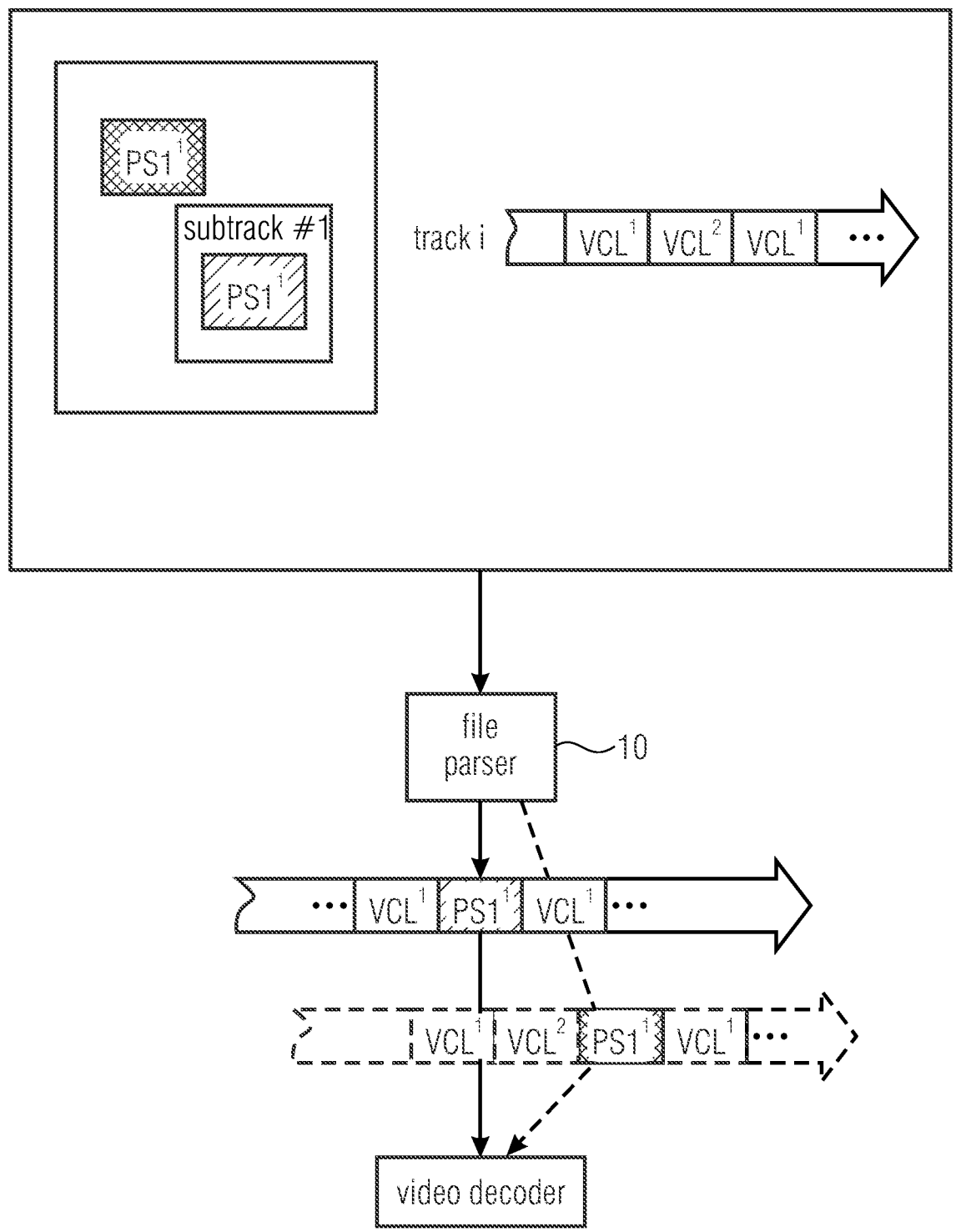
FIG. 12 illustrates another example of a file and a file parser according to the first aspect for single-track scenarios.

The file format parser 10 according to FIG. 11 is configured to receive a file 8 containing a track (track i) which contains a video bitstream or a portion thereof. E.g. the track may comprise one or more "substracks" of the sort discussed above. The file format parser 10 may derive from the file 8 an indication 20 of a set of one or more track partitions, e.g. as indicated by a superscript within the NAL units boxes in FIGS. 11 and 12. E.g., track partitions are sub-tracks or track partitions are sub-samples. Each track partition may relate to a sub-stream out of the video bitstream. Note that not necessarily each NAL unit in the track is associated with at least one of the track partitions. Rather, there may be one or more attributed to no track partition. According to FIG. 11, the file comprises a parameter set (crosshatched in FIG. 11), which may be located in-band as depicted in FIG. 11 or out-of-band as depicted in FIG. 12, the parameter set being for the track to be used for playing a first version of the video bitstream, which involves fully decoding the track in which case file format parser 10 may generate video stream 22 as the video 15 to be forwarded to the decoder 17. I.e. in the case of fully decoding track 13, the VCL NAL units plus crosshatched PS NAL units are forwarded to decoding. According to FIG. 11, the file format parser 10 may derive from the file 8 for a predetermined track partition, e.g. subtrack #1, of the set of one or more track partitions an alternative parameter set 24 and insert the alternative parameter set 24, single hatched in FIG. 11, into the sub-stream and forward same to decoding without the parameter set, the crosshatched one, for playing a second version of the video bitstream, which involves decoding the subtrack excluding a remainder of the track relative to the sub-stream. The remainder comprises all NAL units of the track i without those belonging to subtrack #1.

The parameter set for the first version of the video bitstream may be located in-band, as exemplarily illustrated in FIG. 11. Alternatively, as illustrated in FIG. 12, a parameter set for the first version of the video bitstream, or another version different from the second version, the other version not necessarily involving a full decoding, may be stored out-of-band. In this case, the file format parser 10 may include one of the parameter sets for the different versions of the video bitstream depending on the version to be decoded.

Figure 13:
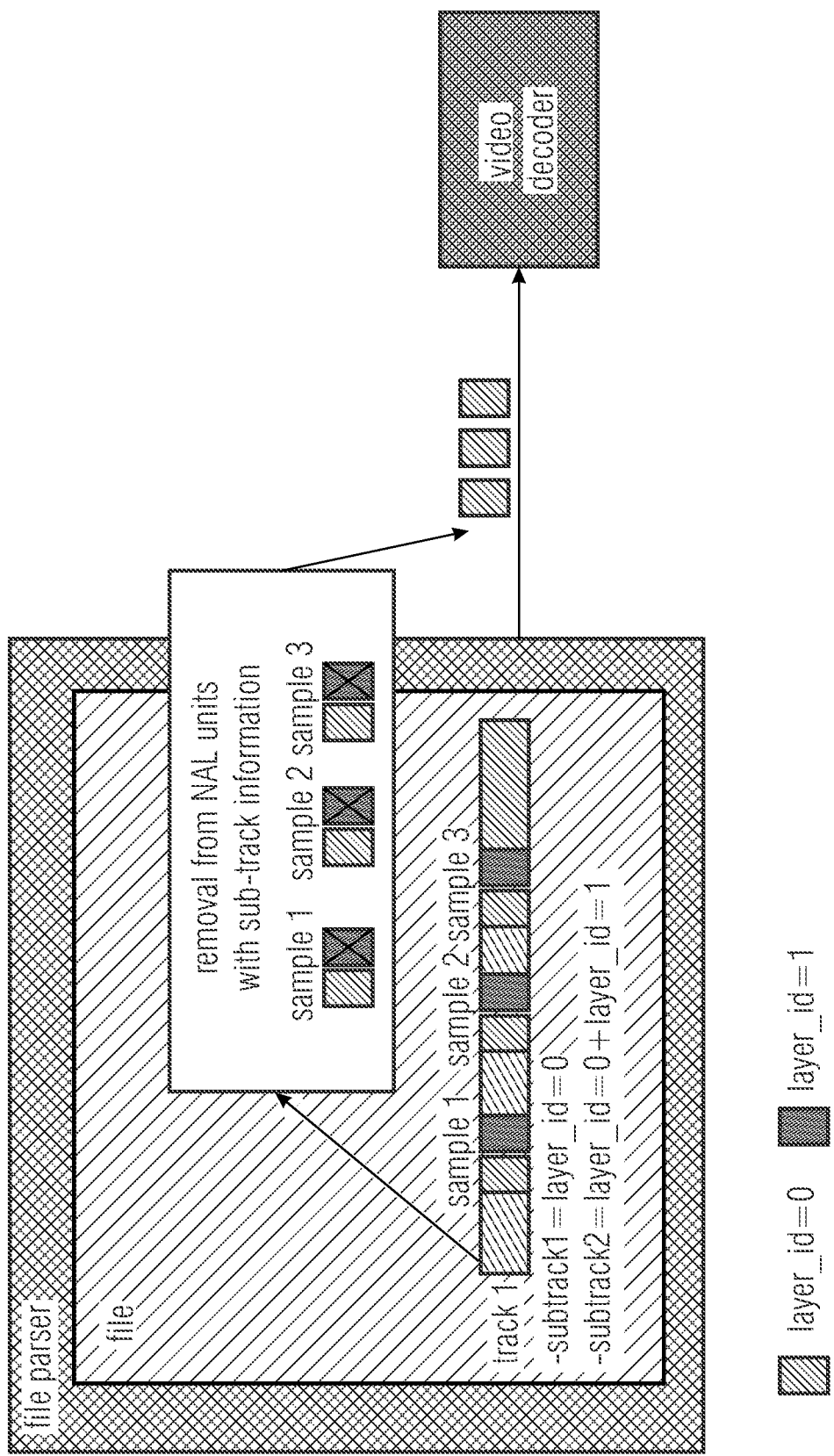
FIG. 13 illustrates another example of a file and a file parser according to the first aspect for single-track scenarios.

FIG. 13 illustrates another example of the file format parser 10, which may optionally be implemented in accordance with the file format parser 10 of FIG. 11 and/or FIG. 12. In the single-track case, it may be needed to allow extracting a subset of NAL units in each sample and that this subset conforms to a valid bitstream, e.g. corresponding to the sub-picture. Different existing mechanisms can be used for this purpose. For instance:
  Sub-tracks
  Subsample information Sub-tracks are described with a box within each track that defines the value of some syntax elements within the stream. A Box needs to be defined and included into the subtrack definition box 'strd'.

```
aligned (8) class XXXXXSubTrackBox
  extends FullBox ('xxxx', 0, 0) {
  unsigned int (16) item_count;
  for(i = 0; i< item_count; i++) {
    unsigned int (x)      syntax_element_1;
    unsigned int (y)      syntax_element_2;
  }
}
```

They specify the values of syntax elements (syntax_element_1 or syntax_element_2 in the example above), as for instance for, layer_id in VVC. It also could be ranges of values, depending on how the XXXXSubTrackBox is defined. Then a parser needs to parse the NAL units within each sample and decide whether they belong to a subtrack or not as illustrated in FIG. 13. In other words, for a track, it is defined as to which NAL units belong to a certain sub-track of the track; the attribution or membership indication is done by indicating a number (item_count) of values (AND of syntax_element_#) which one or more (in the example above two) fields or syntax elements in the NAL units headers (NAL unit type and layer_ID) have to assume to belong to a certain sub-track).

In the case of the subsample information box, a table is used to identify for each sample the size of the subsamples.

```
aligned (8) class SubSampleInformationBox
  extends FullBox ('subs', version, 0) {
  unsigned int (32) entry_count;
  int i, j;
  for (i=0; i < entry_count; i++) {
    unsigned int (32) sample_delta;
    unsigned int (16) subsample_count;
    if (subsample_count > 0) {
      for (j=0; j < subsample_count; j++) {
        if (version == 1)
        {
          unsigned int (32) subsample_size;
        }
        else
        {
          unsigned int (16) subsample_size;
        }
        unsigned int (8) subsample_priority;
        unsigned int (8) discardable;
        unsigned int (32) reserved = 0;
      }
    }
  }
}
```

With any of these mechanisms a subset of the VCL NAL units can be extracted. However, the issue remains that not only a subset of VCL NAL units is needed to form a conforming bitstream, but also non-VCL NAL units like parameter sets need correct and likely different to those reflecting the bitstream of all VCL NAL units.

In one embodiment there is a new box in a file that contains a sub-track/subsample sample entry. This sub-track sample entry contains a sample entry similar to the one that applies to the track but containing the needed parameter sets. For instance, as follows:

```
class VvcConfigurationBox extends Box ('vvcC') {
  VvcDecoderConfigurationRecord ( ) VvcConfig;
}
class VvcSubTrackConfigurationBox extends Box ('vvSC') {
  VvcDecoderConfigurationRecord ( ) VvcConfig;
}
class VvcSampleEntry ( ) extends VisualSampleEntry ('vvc1' or 'vvi1') {
  VvcConfigurationBox config;
  VvcSubTrackConfigurationBox config; // optional
  MPEG4ExtensionDescriptorsBox ( ) ; // optional
}
```

Since there might be more than one extractable subtrack (e.g. a bitstream with 2 regions of interest or 2 RoI with different sizes) it might be desirable to add more than one such subtrack configuration Boxes and then additional mapping to which subtrack it belongs might be needed. An example of such a signaling would be a subtrack_id directly following the subtrack configuration box.

In other words, the idea is that the track may contain in its sample entry parameter sets in a Configuration Record that are to be used when the track is fully decoded. Is a subset thereof is decoded, there is a Subtrack configuration record that contains the parameter sets; which means that the parameter sets in the "normal" configuration record are to be ignored and the ones for a subtrack, which potentially have association information (see new paragraph in the description), are to be used.

It is noted that the embodiments of the file 8 and the embodiments of the file format parser 10 described with respect to FIGS. 3 to 13 may represent independent embodiments of the present disclosure. Further embodiments are provided by file generator 20 configured for generating the file 8. Thus, each of the herein described embodiments of the file format parser 10 is also to be understood as a description of a respective embodiment of a file generator 20. For example, the file generator 20 stores the descriptive data 14 and the coded video data 20 in file 8, so that, if the descriptive data 14 is such that the file parser 10 concludes from the descriptive data that the predetermined parameter set 13[1] is not required for decoding the selected video bitstream, the sub-streams of the selected video bitstream are jointly decodable without the predetermined parameter set 13[1].

2. File Format Parser 10, File Generator 20 and File 8 According to FIGS. 14 to 16

Figure 14:
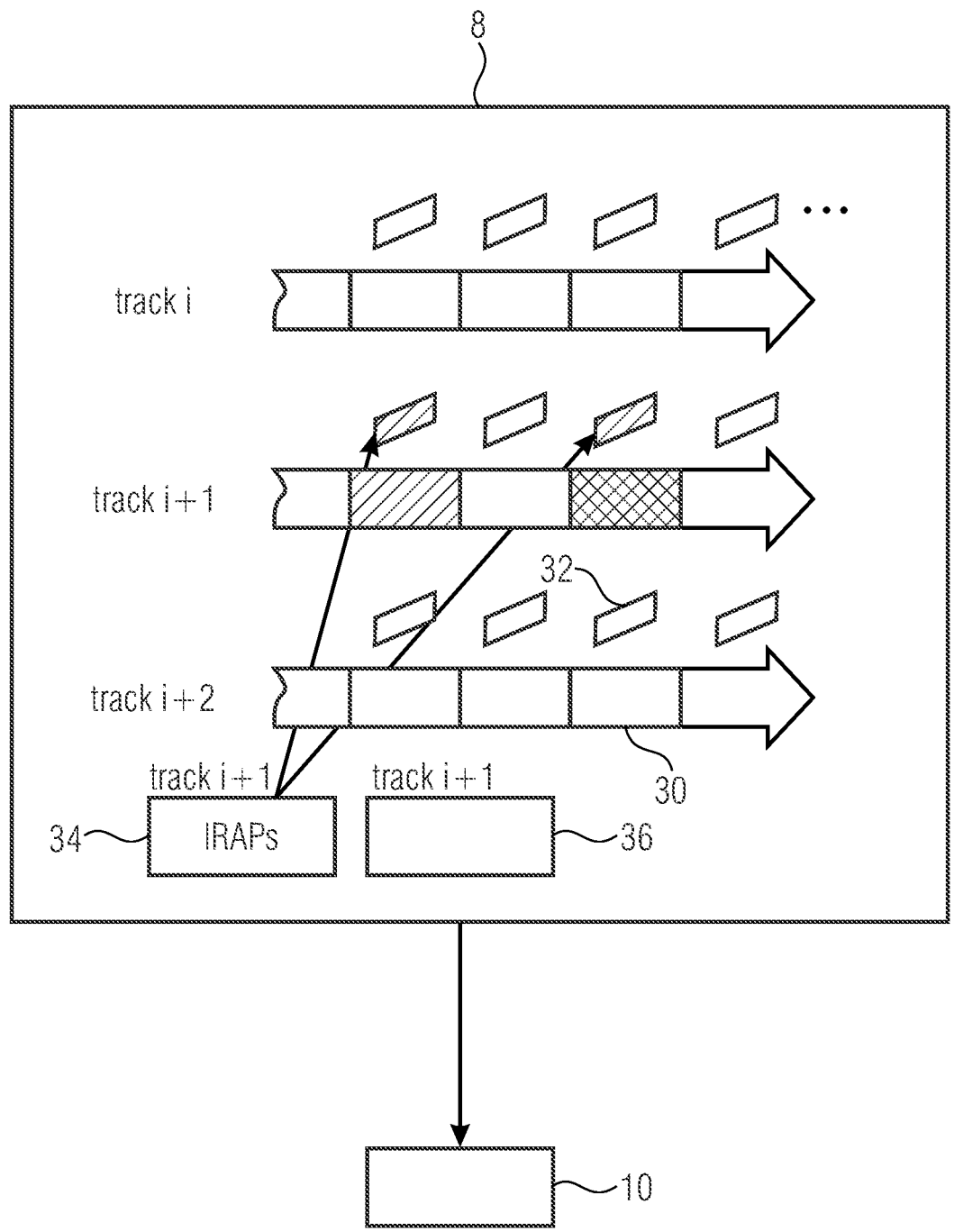
FIG. 14 illustrates an example of a file and a file parser according to the second aspect.

FIG. 14 illustrates a file format parser 10 according to an embodiment of the second aspect of the invention. File format parser 10 according to FIG. 14 may optionally be based on file format parser 10 according to FIG. 1. The file format parser 10 according to FIG. 14 receives a file 8. According to the embodiment of FIG. 14, the file 8 contains a first track, for example, track I or referring to the following figures track 0, and further contains a second track, e.g., track I+1 or referring to the following figures track 1. The second track is dependent on the first track. The first and the second tracks comprise sub-streams of a video bit stream, for example, as explained with respect to FIG. 1 or with respect to section 1. File format parser 10 may derive from the file first information 34, which is indicative of IRAP samples, which are illustrated in FIG. 14 as cross hatched samples underneath cross hatched pictures. In FIG. 14, each sample 30 of a track associated with a corresponding picture 32 is depicted right above the corresponding sample into which same is coded. The first information 34 is indicative of IRAP samples in the second track. Further, the file format parser 10 may derive from the file 8 second information 36, which is indicative of predetermined IRAP samples in the second track, at which switching a track from a third track of the file, which is also dependent on the first track, to the second track is allowed. In FIG. 14, the predetermined IRAP samples are illustrated as simply hedged samples underneath cross hatched pictures. The third track is indicated as track i+2 or, referring to the following figures as track 2. For example, switching from a third track to the second track may be allowed because of replacement parameter set NAL units or other out-of-band parameter set NAL units being present for the first track for that case or for the predetermined IRAP samples so that the RPR referencing is made correctly, while such parameter sets NAL units are not available for other IRAP samples.

For example, the file format parser 10 according to FIG. 14 provides support for dynamic region of interest (ROI).

Figure 15:
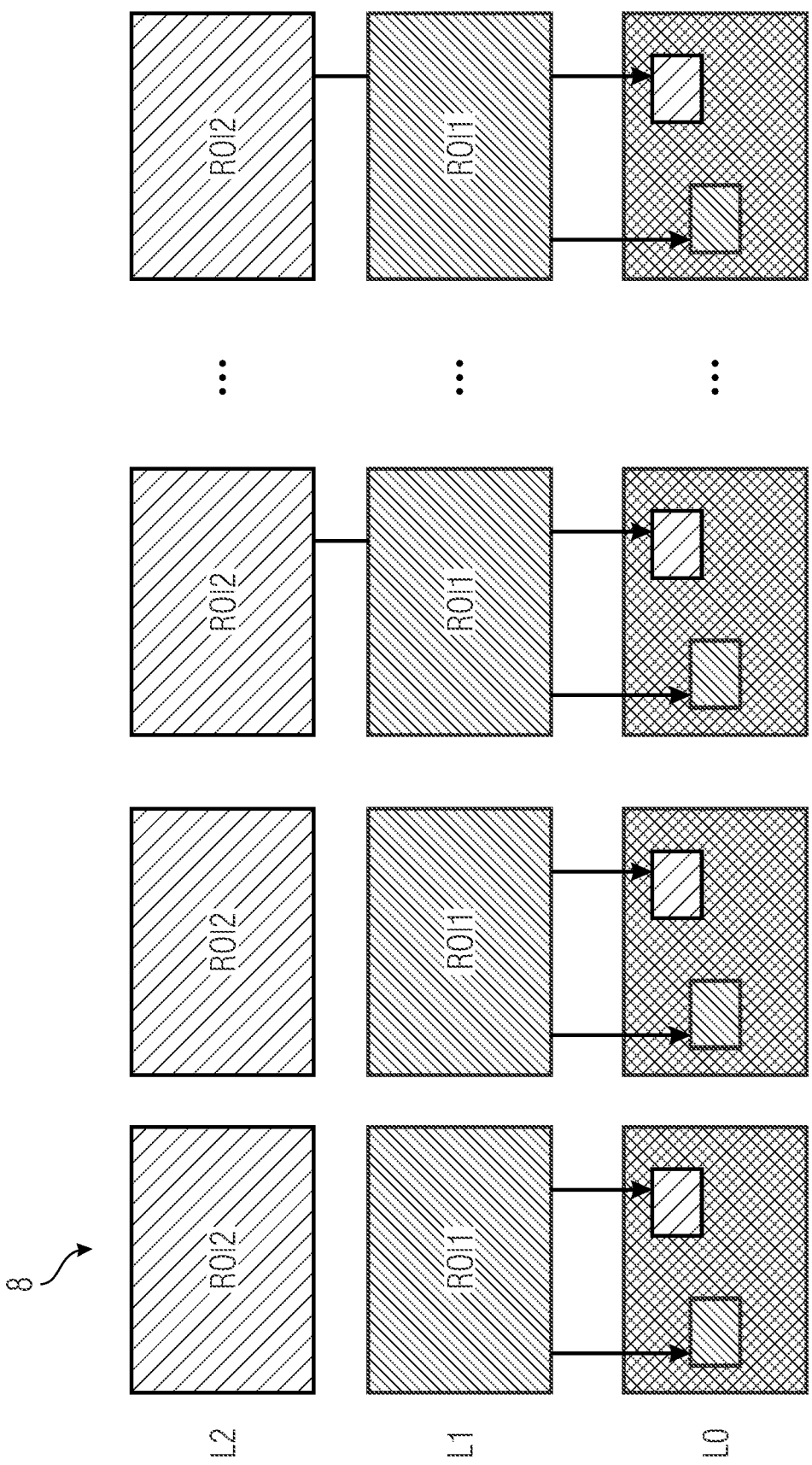
FIG. 15 illustrates another example of a file according to the second aspect.

Support for dynamic RoI scalability (e.g. providing a high-res version of two or more RoIs or a spatially moving RoI in the bitstream together with the full-overview video) is limited in VVC. It can be partially done with using a multi-layer approach and RPR based on the scaling window signaling. FIG. 15 illustrates an example of two ROIs offered for the video in L0.

Scaling window signaling in VVC works as a motion vector offset and as basis for the scaling factor derivation between pictures, e.g. when scaling window stays constant in size→no scaling and no resampling of reference pictures.

However, the scaling window is indicated in the parameter sets of the origin layer (L0 in the below example) and not in the target layer (as is done in SHVC for instance, L1 or L2). Also, the scaling window is used in both inter-layer and intra-layer motion compensated prediction, and therefore, when RPR is used for dynamic ROI scalability wherein the origin layer (L0) does not exercise reference picture resampling, the scaling window has to be constant in size and position over time in an IDR period. Therefore, scaling windows can only change in a base layer at IDR pictures, where all former reference pictures are discarded and a change in scaling window would have no effect. Any application can change the PPS and add a scaling window that stays constant (or is at least coherent if reference picture resampling is to be used in L0, i.e. coded picture size changes) without changing the decoding process. With this approach, different RoIs can be provided per enhancement layer (L1 or L2), i.e. a dynamic RoI can be supported with a multilayer approach.

In the example of FIG. 15 there are three subsets of layers, i.e. bitstreams, that a decoder could decode: namely the whole scene (L0), ROI1 (i.e., L0+L1) or ROI2 (i.e., L0+L2).

Figure 16A:
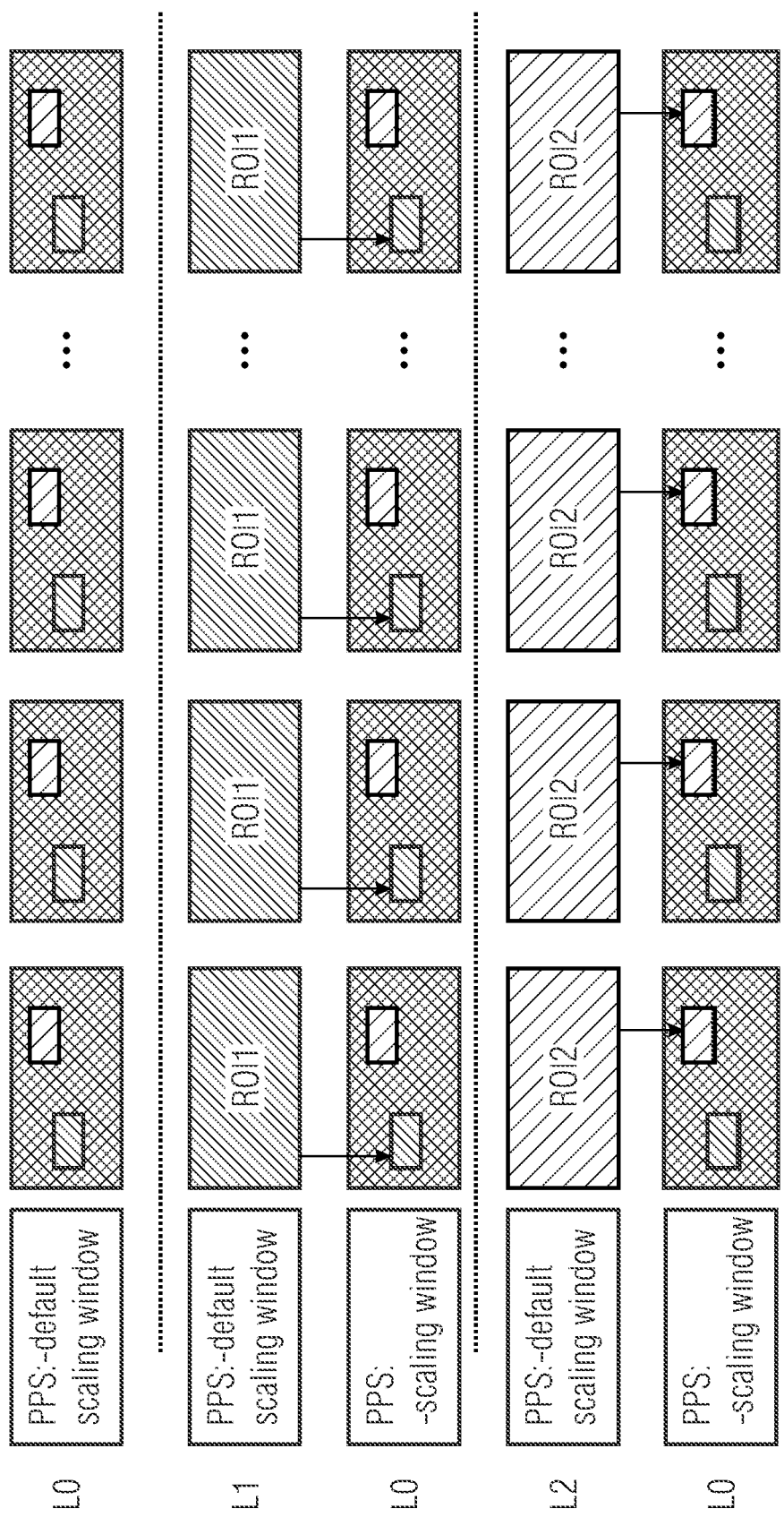
FIG. 16A illustrates another example of a file according to the second aspect.

FIG. 16A illustrates decodable subsets for an example configuration. As can be seen in FIG. 16A, depending on what is decoded a different PPS is needed for the layer L0 to indicate a particular scaling window (either matching ROI1, ROI2 or the whole picture which is indicates as "default scaling window").

Note that scaling windows affect the motion compensation process as described above, i.e. acting as an offset to each motion vector and for derivation of a scaling factor to resample a reference when applicable. When it is desired to switch decoding from ROI1 to ROI2, the scaling window indicated in L0 will have to be change accordingly, i.e. the PPS will have to change. For the above described reasons, this can only happen at pictures of the base layer that have a prediction break, i.e. IDR pictures. Such samples of the enhancement layer dependent tracks (i.e. having IDRs in all the lower layer tracks) should be marked as sync samples. For the remaining IDR samples of EL tracks that are not aligned with IDR in the lower layer tracks, they are still relevant to be recognized by a player, e.g. for trickmodes such as fast forwarding. In such a mode, a reduced version of the bitstream is played back at a higher-than original frame rate, for instance, comprising all IDR samples (and dependencies) of the EL track. For EL IDR pictures with L0 trailing pictures to be decoded correctly, either all samples of L0 have to be decoded or the respective L0 trailing pictures are encoded in a special way such as when being marked as of a dependent RAP (DRAP) type and only using their associated L0 IDR as reference.

Therefore, in one embodiment, a sample entry type or a flag in the sample entry or a SAP type or a sync sample indication allows to differentiate two types of samples in the dependent track:

first samples of the track that allow for dependent track switching from, second samples of the dependent track that allow for trick mode playback, e.g. seeking, but are not sufficient for switching into the track from another track.

Figure 16B:
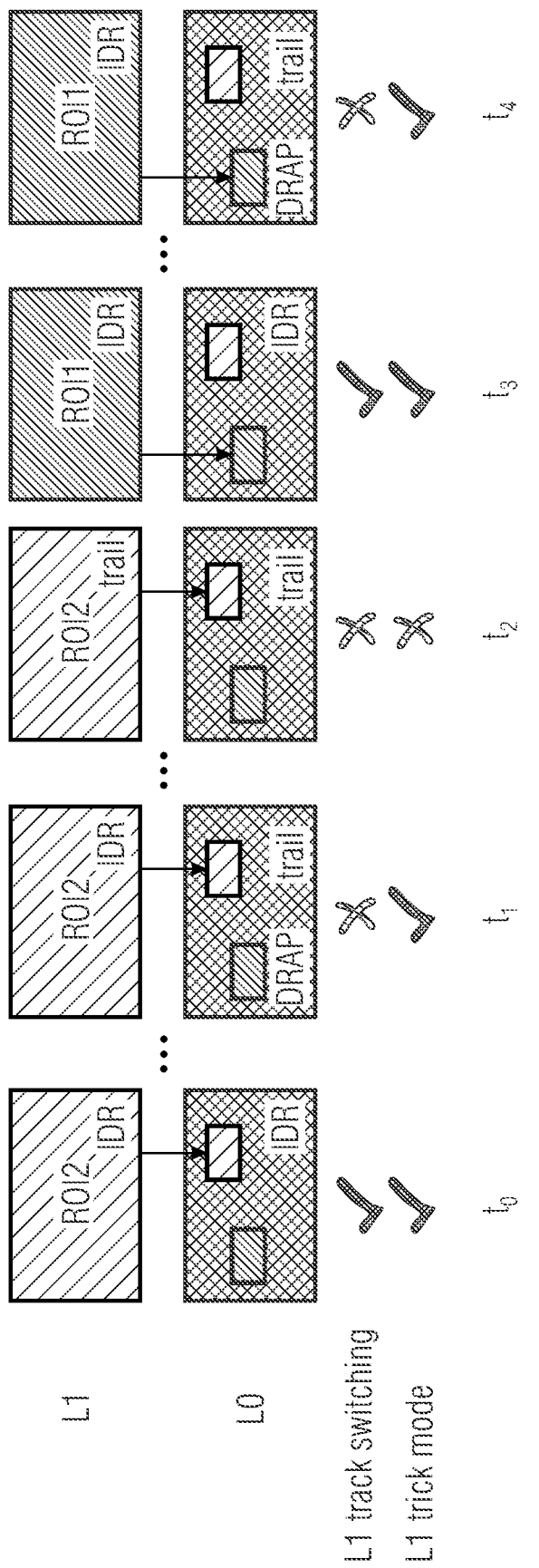
FIG. 16B illustrates another example of a file according to the second aspect.

FIG. 16B illustrates the difference between the two classifications of higher layer IDR samples that the invented indication is supposed to signal. For example the embodiment of FIG. 17 may implement a differentiating of dependent track samples that are eligible for track switching from those that can be used for trick play.

However, a further issue that arises in the described scenario is for the player to recognize the correct parameter sets for the selected track combination. In one embodiment, a similar solution as discussed in section 1 for option 1 (the multi-track case, e.g. FIG. 3) can be used, i.e. signaling thought a sample entry or flag/syntax therein that indicates when to keep parameters in the base layer (or base track) and when to ignore them as the right parameters are included in another layer (or track).

In other words, the file format parser 10 may derive from the file fourth information whether parameter sets present in the file for the first track should be removed in case of playback of a dependent track which depends on the first track. If the fourth information indicates for the first track that the parameter sets in the first track are to be removed in case of playback of a dependent track which depends on the first track, the file format parser 10 may forward the first track without the parameter sets to a video decoder in case of playback one of the second and third tracks. If the fourth information does not indicate for the first track that the parameter sets in the first track are to be removed in case of playback of a dependent track which depends on the first track, the file format parser 10 may forward the first track along with the parameter sets to a video player in case of playback of one of the second and third tracks.

Optionally, the parameters sets may be contained in the first track in-band, and the file 10 format parser may, if the fourth information indicates for the first track that the parameter sets in the first track are to be removed in case of playback of a dependent track which depends on the first track, forward the first track having the parameter sets stripped off to the video decoder in case of playback of one of the second and third tracks, and if the fourth information does not indicate for the first track that the parameter sets in the first track are to be removed in case of playback of a dependent track which depends on the first track, the file format parser may forward the first track having the parameter sets remaining therein to the video decoder in case of playback of one of the second and third tracks.

In another embodiment, different sample entries are used in the base layer, each of which contains the correct parameter sets for the case that the base layer is played alone, or together with one track or another track. This means in the example above 3 different sample entries.

That is, the file format parser 10 may derive from the file at least one of a set of information boxes which are present in the file for the first track, wherein each of the set of information boxes is associated with an associated track out of the first track and dependent tracks which are dependent on the first track and comprises a version of parameter sets to be forwarded to along with the first track in case of playback of the associated track, wherein the one information box at least derived is the information box associated with a track to played back.

The current ISOBMFF allows using different sample entries for an elementary stream. There are different options to determine which sample entry is in place at each moment:
1) There is a sample to chunk box 'stsc' in case the samples are not stored in media fragments that index samples to sample entries or indexes samples to sample entries.
2) There is a sample description index in the track fragment header 'tfhd' when the file contains media fragments However, none of these mechanisms envisions determining the sample entries not at the track that contains the sample entries but at another track, as it would be needed in the described case. Therefore, it is part of the invention that some track modifies the "active" sample entry in another track.

For instance, in fragmented media, in case of a dependent track as envisioned above, the track fragment header 'tfhd' or a new box named dependent track 'dtfh' of dependent tracks could include pairs of track reference ids and sample description indexes to indicate which sample entry to use in the referenced tracks. Example for 'tfhd':

```
aligned (8) class TrackFragmentHeaderBox
extends FullBox ('tfhd', 0, tf_flags) {
   unsigned int (32) track_ID;
   // all the following are optional fields
   unsigned int (64) base_data_offset;
   unsigned int (32) sample_description_index;
   unsigned int (32) default_sample_duration;
   unsigned int (32) default_sample_size;
   unsigned int (32) default_sample_flags
   unsigned int (32) num_dep_sample_entries;
   {
      unsigned int (32) track_ref_idx;
      unsigned int (32) ref_track_sample_description_index;
   }
}
```

3. File 8, File Generator 20 and File Parser 10 According to FIG. 17, and Client 90 and Manifest File 5 According to FIG. 18

Figure 17:
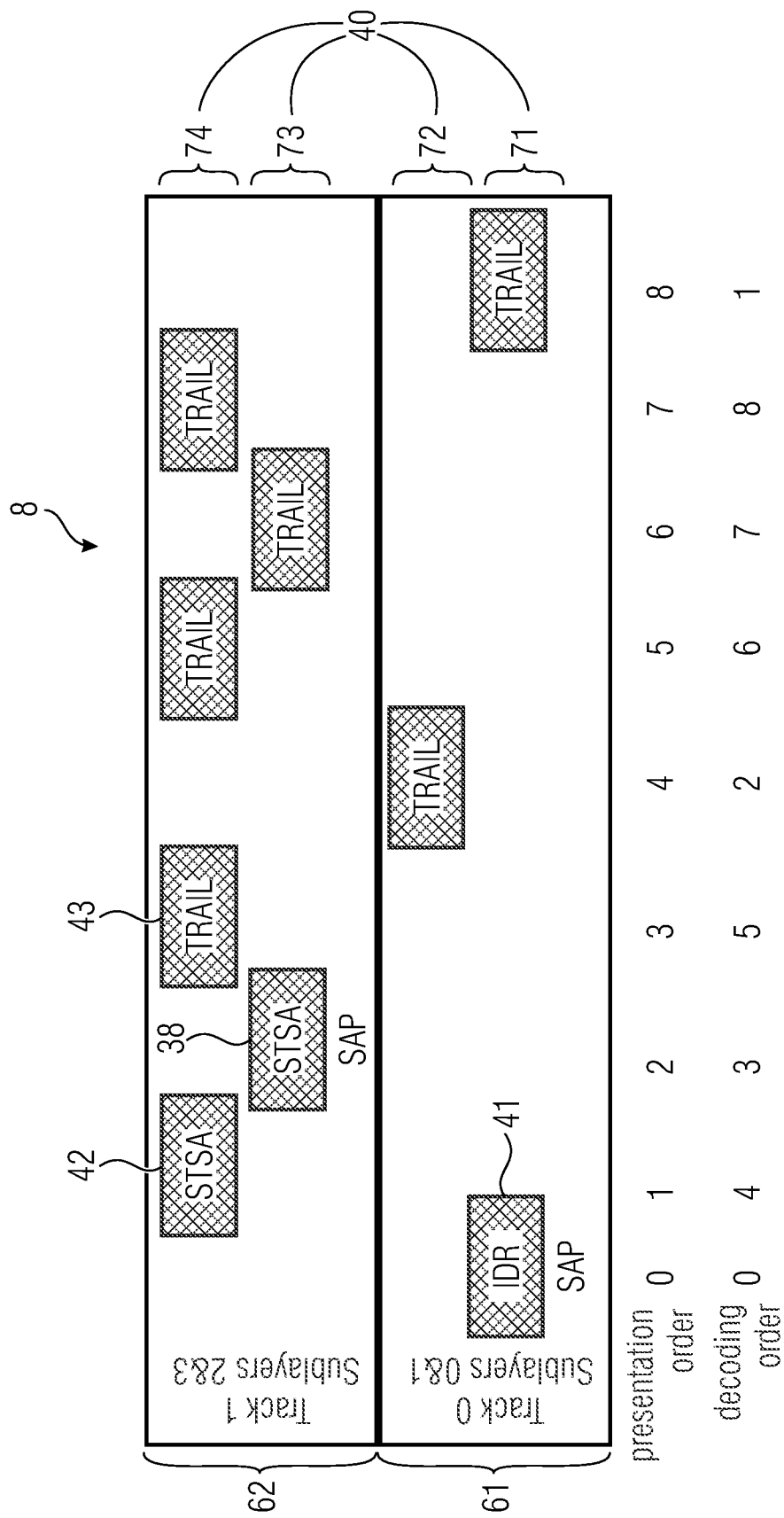
FIG. 17 illustrates an example of a file according to the third aspect.

FIG. 17 illustrates an example of a file 8 as it may be generated by file generator 20 of FIG. 2 according to a third aspect of the invention and as it might be parsed by file parser 10 of FIG. 1 according to the third aspect of the invention.

As described with respect to FIG. 1, the video bitstream contained in file 8 may comprise or be composed of multiple temporal layers. FIG. 17 shows such an example, in which file 8 comprises a plurality of temporal layers 14, the plurality of temporal layers 14 comprising a first group of temporal layers and a second group of temporal layers. The first group of temporal layers comprises sublayer 71 and sublayer 72. The second group of temporal layers comprises sublayers 73 and sublayers 74. The first group of temporal layers is associated with a first track 61 of file 8, that is, the first sublayer 71 and the second sublayer 72 are contained in a first track 61 of file 8. Sublayer 73 and sublayer 74 of the second group of temporal layers are part of a second track 62 of file 8.

The sublayer 73, which is the lowest temporal layer of the second group of temporal layers which is associated with the second track 62, comprises an STSA (stepwise temporal sublayer access) picture 38, i.e., a picture of type STSA. Sublayer 74, which is a higher temporal layer compared to sublayer 73, comprises an STSA picture 42 which is the first picture following the STSA picture 38 in decoding order. That is, for each temporal layer other than the temporal layer 73 associated with the STSA picture 38, which temporal layer is of the second group of one or more temporal layers which is associated with the predetermined track 62, namely the sublayer 74, a picture which firstly follows the STSA picture 38 in decoding order among pictures of the sublayer 74 is of STSA type. According to this criterion, the file format generator 20 may provide an information in file 8 which marks the STSA picture 38 as a possible stream access point, e.g. mark the STSA picture 38 as a stream access point picture (SAP picture). Thus, in file 8, the STSA picture 38 may be marked as a possible stream access point, e.g. g. as picture of STSA type 1 or 2: In the example of FIG. 17, the STSA picture 42 precedes the STSA picture 38 in presentation order. In this case, according to examples, the information in file 8 may mark the STSA picture 38 as STSA type 2. In other examples, in which the second group of tracks to which the predetermined track 62 is associated does not comprise a STSA picture preceding the STSA picture 38 in presentation order, the information in file 8 may mark the STSA picture 38 as STSA type 1 (cf. e.g. Table 1). The decoding order, in which decoder 17 is expected to decode the pictures of tracks 61 and 62 and the presentation order in which the pictures are to be presented, are indicated in FIG. 17.

As an alternative criterion, file generator 20 may provide an information in file 8 which marks an STSA picture of a predetermined track, e.g., the second track 62, e.g., the STSA picture 38, which is located in a lowest temporal layer of the predetermined track as a possible stream access point, e.g. as STSA type 3, if for each other temporal layer of a group of one or more temporal layers associated with the predetermined track, e.g., the second group of temporal layers comprising sublayer 73 and sublayer 74, a picture which firstly follows the STSA picture 38 in presentation order, e.g. picture 43, is of an STSA type. An example of this alternative scenario may be represented by the scenario of FIG. 17, replacing the type of picture 43 with a STSA type, and optionally replacing the STSA picture 42 with a non-STSA picture. Thus, in examples, the file generator 20 may mark the STSA picture 38 as stream access point, e.g. as STSA type 3, if, additionally, pictures of further sublayers of the group of sublayers associated with the predetermined track 62, i.e. sub-layer 74 in case of FIG. 17, which firstly follow the STSA picture 38 in decoding order, i.e. picture 42 in FIG. 17, is not a STSA picture (cf. e.g. Table 1).

It is noted, that the sublayers 71, 72, 73, 74 are hierarchical. For example, each of the sublayers comprises pictures which in combination with the pictures of one or more of the lower sublayers provide a bitstream having a higher framerate as a bitstream relying on lower sublayers only. For example, sublayers higher than a lowest sublayer of the coded video data of file 8 may be decoded only in combination with at least the lowest sublayer of the coded video data, e.g., sublayer 71 in FIG. 17. In examples, a decoding of a sublayer may involve all lower sublayers. In particular, the temporal layers of different groups may be mutually not interleaved hierarchically.

In examples, the two alternatives of the two preceding paragraphs are combined, and the information marking the STSA picture as SAP picture differentiates between the two alternatives, e.g. by marking the STSA picture using a STSA type specific to the respective alternative.

Temporal layers may provide for a scalability of the video stream 15 provided for decoder 17. For example, decoder 20 may start decoding a track, e.g., the second track 62, for example, additionally to the first track 61, starting from SAP picture, e.g., the STSA picture 38. Based on the marking of the STSA picture 38 as SAP picture, the file parser 10 may recognize, that decoder 17 may start decoding the second track 61 from the STSA picture 38 and may provide the samples, i.e., the pictures, of the second track 62 in the video bitstream 15 from the STSA picture 38 indicated as SAP picture onwards. That is, the file parser 10 may include all pictures following the STSA picture 38 marked as SAP picture in the decoding and/or presentation order. This may include all pictures of higher sublayers of the second track to which the STSA picture 38 belongs.

For example, the predetermined track 62 is a dependent track which depends on the first track 61, which may be referred to as a further track of the set of tracks to which the second track, the predetermined track 62, belongs. As shown in FIG. 17, the further track 61 is associated with a further group of temporal layers, the sublayers included in the first group of temporal layers being hierarchically beneath the sublayers of the second group of temporal layers, which is associated with the predetermined track 62.

In examples, file generator 20 may mark a random access point picture (RAP picture) in the lowest temporal layer of file 8, i.e. temporal sub-layer 71, as a SAP picture, as shown in FIG. 17. According to an example of the third aspect of the invention, the RAP picture, indicated using reference sign 41, may be marked as SAP picture using a different sample type, e.g., a NAL unit type, as a sample type using which the STSA picture 38 is marked as SAP picture.

According to an embodiment of the third aspect of the invention, file parser 10 of FIG. 1 may derive the information marking a picture as a possible stream access point, and may use the marked picture as a stream access point. For example, file parser 10 may start forwarding pictures associated with the predetermined track 62 which is associated with the picture 38 marked as stream access point from the picture 38 marked as stream access point onwards. That is, e.g. the file parser may forward the SAP picture 38 and all pictures of the predetermined track 62 following the SAP picture 38 in presentation order or in decoding order.

In examples, in case of the above mentioned STSA type 3, the file parser 10 may exclude the picture 42 from forwarding into the video bitstream 15 for decoding and/or not subject the picture 42 to decoding. In examples, the file parser 10 may treat the picture 42 as not to be output. Further, in examples, the file parser 10 may exclude pictures, which a decoding of which depends on picture 42 from forwarding or from decoding.

In other words, a simple scalability variant in VVC is temporal scalability. In such cases there are only NAL units with the same layer_id but different temporal_ids, i.e. sub_layers. When the temporal sublayers of a coded layer in a VVC bitstream are put into individual ISOBMFF tracks, STSA (step-wise temporal sublayer access) pictures can serve as a Stream Access Points, i.e. a decoder can start decoding a track from the STSA sample onwards.

For instance, the following FIG. 17, the two lower temporal sublayers 0 and 1 are jointly contained in a single Track 0, while the upper two temporal sublayers 2 and 3 are jointly contained in a single Track 1. It is state of the art to mark the IDR picture at the start of Track 0 to be a Stream Access Point SAP of type 1 or 2, so FF parser know that a decoder can start decoding the track from here-on.

However, it is unclear that a non-RAP sample in a track may also represent a SAP, e.g. the first STSA in decoding order (Presentation Time 2, Decoding time 3) in the above examples can also represent a SAP. Therefore, the invention is to mark the STSA samples that belong to the lowest temporal sublayer (Sublayer 2 in the example) in a track as Stream Access Points under the condition that all the first samples (Presentation Time 1, Decoding time 4) of each higher temporal sublayer (Sublayer 3) following in decoding order in the track are also of type STSA. Such cases would correspond to a SAP type 1 or SAP type 2. Another part of the invention is to mark the STSA samples that belong to the lowest temporal sublayer (Sublayer 2 in the example) in a track as Stream Access Points under the condition that all the first samples following in Presentation Time of each higher temporal sublayer (Sublayer 3) following in the track are also of type STSA. This case would correspond to SAP type 3.

Note that Stream Access Points (SAPs) enables random access into a container of media stream(s). A SAP is a position in a container enabling playback of an identified media stream that can be indicated in the file format using the (segment index) 'sidx' box. The 'sidx' box indicates byte ranges within a file and indicate which type of SAP the position in the file corresponds to. Also a similar information could be provided by a table that maps samples as belonging to a sample group. A sample group of type 'sap' could be used with the different types: 1, 2, 3 . . . .

SAPs can be also used for streaming, e.g. for DASH streaming, where random access or switching from one representation in DASH to another is usually done at SAP positions. The manifest in DASH, i.e. the MPD, would indicate whether segments start with a given SAP or not so that the DASH client can react correspondingly. In any case, the 'sidx' box information and MPD information is equivalent, as it indicates positions within the bitstream that correspond to SAPs of a given type.

TABLE 1

| NAL Unit Type | ISOBMFF sync sample status | DASH SAP type |
| --- | --- | --- |
| STSA | true if Tid equal to smallest Tid in track and the first following sample of each further sublayers in decoding order | 2 (if the STSA has pictures following in decoding order that precede it in presentation order, where the first following sample of each further |

TABLE 1-continued

| NAL Unit Type | ISOBMFF sync sample status | DASH SAP type |
|---|---|---|
| | are of type STSA. Since they are dependent on another track, alternatively theses sample could be marked differently, e.g. dependent sync samples. | sublayers in decoding order are of type STSA) 1 (if the STSA does not have pictures following in decoding order that precede it in presentation order first following sample of each further sublayers in decoding order are of type STSA) 3 (if the STSA has pictures following in decoding order that precede it in presentation order, where the first following sample of each further sublayers in presentation order are of type STSA and not all the first following sample of each further sublayers in decoding order are of type STSA) cp. |

This means that in the ISOBMFF, STSA can be signaled as SAP types of type 1 or 2 or 3 as long as they have the smallest Tid within their track and the first following sample of each further sublayers in decoding order or presentation are of type STSA as described in the table above.

Figure 18:
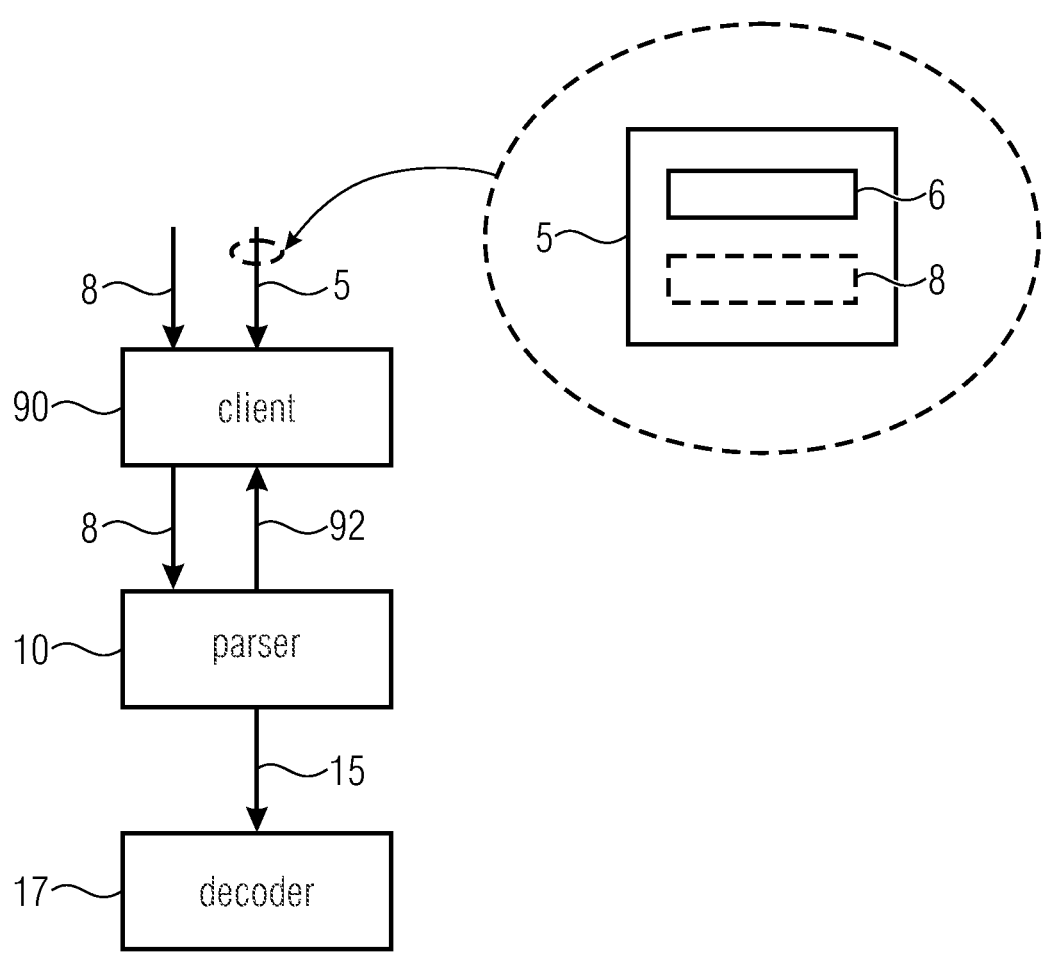
FIG. 18 illustrates an example of a client device and a manifest file according to the third aspect.

FIG. 18 illustrates a client 90 according to an embodiment, the client 90 being described in conjunction with the file parser 10 and the decoder 17 of FIG. 1. The client 90 may be part of a device comprising the file parser 10 and/or the decoder 17 or may be implemented separately, configured for communicating with file parser 10. For example, client 90 may retrieve the file 8, as described with respect to any of the aspects of the present disclosure, from a server and provide the file 8 to the file parser 10, e.g. in streaming scenarios. Client 90 may receive a manifest file 5, e.g. a MPEG-DASH file in case of MPEG-DASH streaming, from the server. The manifest file 5 may include one or more definitions of media representations downloadable from the server, e.g. one or more choices of a video bitstream of a video sequence. E.g., the different choices may differ in bitrate, framerate, ROI, i.e. subpicture, as described with respect to FIG. 1. The file parser 10 may select one possible choice of the bitstream, i.e. a video stream comprising one or more sub-streams of the video sequence and send an indication 92 of the selected bitstream. Client 90, may decide, based on the selected video stream, which of the media representations indicated in the manifest file 5 to download from the server and may download the file 8 comprising the selected media representation. E.g., file 8 may include only tracks which are needed for the video stream selected by file parser 10.

For example, a media representation may be indicative of at least a portion of the descriptive data 14, e.g. parameter sets describing track dependencies, dependencies between layers and/or temporal layers. In other words, the manifest file may define a media representation by means of indicating one or more tracks, layers, and/or temporal layers.

The manifest file may include at least a first definition 6 of a set of media representations and may optionally include a second definition 8 of a set of media representation, e.g. a set of sub-representations of one of the media representations (i.e. a predetermined media representation) of the set defined in the first definition 6.

In particular, the manifest file 8 may include an indication of segments of one of the media representations, which segments include a stream access point for starting (or switching to) a decoding of the one media representation (e.g. the predetermined media representation). A segment may refer to a sub-sequence of the video sequence represented by the video stream. In particular, the manifest file may indicate segments which comprise STSA pictures as described within this section.

Indicating positions of SAP pictures in the manifest file allows the client to selectively download data which is decodable, as a download of pictures preceding a stream access point may be avoided. In other words, when switching of the video stream is desired, the client may wait with downloading the associated media representation until a SAP is indicated.

4. File 8, File Generator 20 and File Parser 10 According to FIGS. 19 and 20

Figure 19:
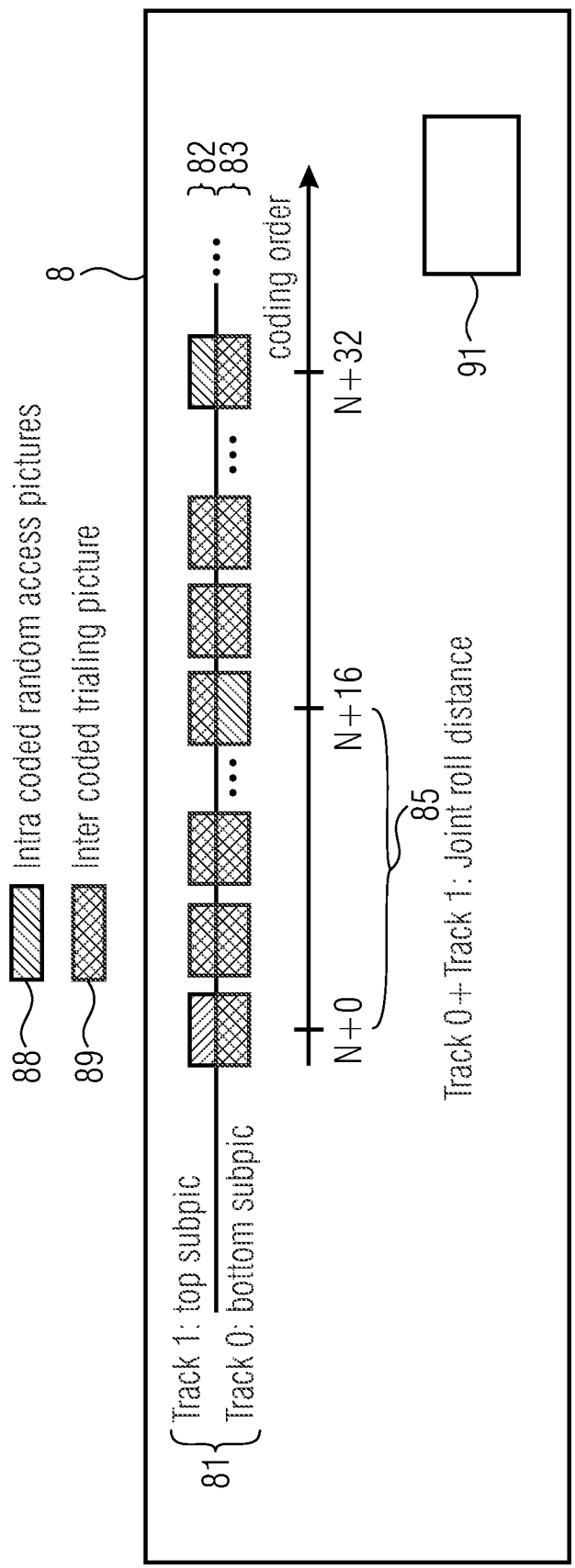
FIG. 19 illustrates an example of a file according to the fourth aspect.

FIG. 19 illustrates a file 8 according to an example of the fourth aspect of the invention. File 8 comprises a plurality of video sub-streams which are independently coded onto a group 81 of tracks. E.g., the group 81 of track may be a sub-group of a set of tracks of file 8. In the example of FIG. 19, the plurality of video sub-streams comprises a first video sub-stream coded onto a first track 83 and a second video sub-stream coded onto a second track 82. The first and the second video sub-stream are coded independently, that is, each of the first and the second sub-streams may be decoded independently from each other. Further, the first and the second sub-streams of the first track 83 and the second track 82 may be decoded jointly. For example, the first sub-stream and the second sub-stream may represent complimentary sub-pictures of a sequence of pictures derivable from a jointly decoded video stream comprising the first sub-stream and the second sub-stream. The first and the second sub-streams both comprise pictures of their respective sub-streams, i.e., sub-pictures of the joint picture of the first and the second sub-stream, which are coded independently from previous pictures of their respective sub-streams. Thus, a decoder may start decoding the respective sub-stream from the respective independently coded pictures, indicated using reference sign 8 in FIG. 19. For example, the independent coded picture is an intra-coded picture, e.g., an intra-coded random access picture (RAP). The respective independently coded pictures of the first sub-stream and the second sub-stream of the first track 83 and the second track 82 are not necessarily temporally aligned to each other. For example, it may be beneficial to not temporally align the independently coded pictures of the first track 83 and the second track 82 so as to distribute high bitrates to different time frames. In a joint decoding of the first and the second sub-streams, a joint picture which does not depend on previous pictures may involve an independently coded sub-picture of both of the first and the second sub-streams. Thus, decoder refresh, that is, an availability of an independently coded picture covering the whole picture area of the joint picture comprising the first and the second sub-streams, may not be completed before a decoding of independently coded pictures of both sub-streams. Thus, a temporal length of an interval after which a decoder refresh is complete may be determined by a temporal distance between independently coded pictures of the first and the second sub-streams. Embodiments of section 4 may embody the fourth aspect.

The file generator 20 may determine the temporal length, indicated in FIG. 19 using reference sign 85, of an interval after which the decoder refresh is complete and indicate the temporal length 85 for the joint decoding of the first and the second sub-streams in the file 8 by incorporating a respective information 91 in file 8. Consequently, the file 8 may comprise an indication 91 of the temporal length 85 for the joint decoding of the first and the second sub-streams.

For example, information 91 may indicate the temporal length 85 in a number of pictures or samples. E.g., a number of immediately consecutive pictures which starts from IRAP pictures of one track of the respective sub-group and extends therefrom along (in forward or reward direction) decoding order for which number of consecutive pictures, in each other track of the respective sub-group, at least one IRAP picture of the respective other track exists which is co-temporal to any of the number of immediately consecutive pictures.

The file generator 20 may determine the temporal length 85. For example, the file generator 20 may look, for the group 81 of track, for IDR pictures of the video sub-streams 82, 83 distributed onto the respective sub-group of tracks so as to determine the temporal length 83. Alternatively, the file generator 20 obtains such information from the encoder or a file designer.

Figure 20:
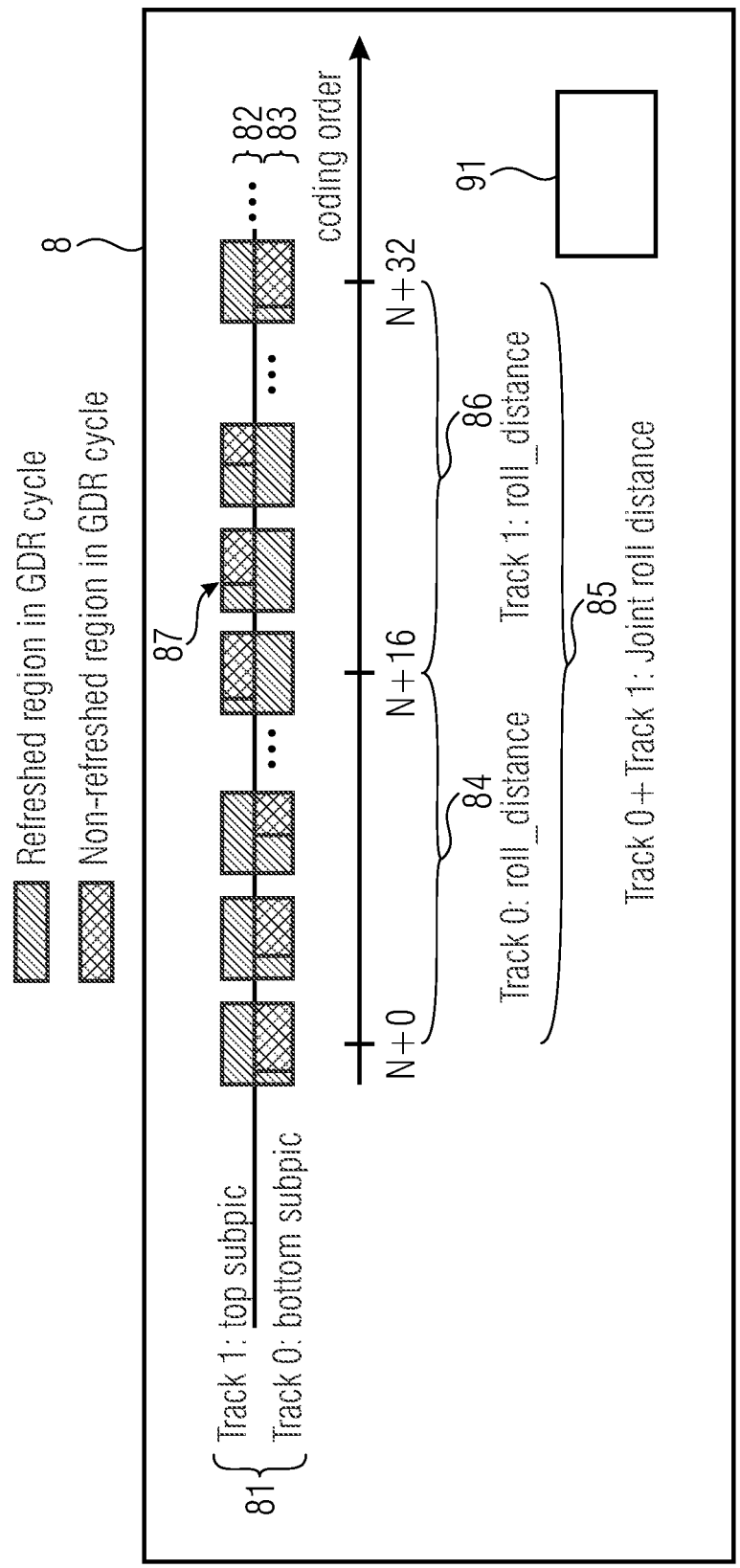
FIG. 20 illustrates another example of a file according to the fourth aspect.

FIG. 20 illustrates another example of file 8 according to a further embodiment of the fourth aspect of the invention. The file 8 of FIG. 20 differs from the file of FIG. 19 in that the refresh of the sub-streams is distributed over a plurality of pictures of the sub-stream, e.g. by implementing a gradual decoder refresh (GDR). That is, each of the plurality of pictures, over which the refresh is distributed may comprise a portion 87 of the picture which is coded independently from previous pictures. Thus, the high data volume of independently coded portions of the pictures is distributed over a plurality of pictures of the sub-streams. According to the example of FIG. 20, a refresh of the sub-stream of the first track 83 is distributed over pictures within a first period 84, while a refresh of a sub-picture of the sub-stream of the second track 82 is distributed over a plurality of sub-pictures of a period 86, which differs from period 84. Period 84 and period 86 may be not overlapping, as shown in FIG. 20. The temporal length 85 over which a complete refresh of jointly decoded stream comprising the first and the second sub-streams of the first track 83 and the second track 82 is accomplished includes at least one period 84 and period 86 of a complete refresh of the individual sub-streams.

For example the information 91 may indicate, in the example of FIG. 20, the temporal length as a number of immediately consecutive pictures which starts from pictures of GDR cycles of one track of the respective sub-group and extends therefrom along (in forward or reward direction) decoding order, for which number of consecutive pictures, in each other track of the respective sub-group, at least one GDR cycle of the respective other track exists for which all pictures are co-temporal to any of the number of immediately consecutive pictures.

The file generator 20 may determine the temporal length 85. For example, the file generator may look, for the group 81 of track, for GDR cycles of the video sub-streams 82, 83 distributed onto the respective sub-group of tracks so as to determine the temporal length 83. Alternatively, the file generator 20 obtains such information from the encoder or a file designer.

The file parser 10 may retrieve the information 91 from file 8 and may use the information 91 as decision basis for deciding when to switch between joint decoding among the one or more sub-groups, or to render the temporal length available to an external device as a decision basis for deciding when to switch between joint decoding among the one or more sub-groups. For example, information 91 may be used by file parser 10 for determining a position for switching from forwarding only one of the two subs-streams 82, 83 in the video bitstream 15 to jointly forwarding both of them.

The above mentioned gradual decoder refresh (GDR) approach is used to spread the bitrate peak of intra-coded random access pictures across multiple N successive pictures. When random-accessing such a bitstream, a decoder has to decode N frames from the beginning of such a GDR cycle (e.g. indicated as being a so-called GDR picture occurring at every IRAP-distance-th temporal distance) before a correctly reconstructed picture can be presented.

Typically, the N frame period is conveyed as a roll distance parameter (File Format) or in terms of a Picture Order Count (POC) information (recoveryPOC in VVC syntax). For reference, the file format syntax for roll distance parameters of video signals is replicated below and describes is signaled for a sample group within a track.

A VisualRollRecoveryEntry documents samples that enable entry points into streams that are alternatives to sync samples.

```
class VisualRollRecoveryEntry ( ) extends VisualSampleGroupEntry
('roll')
{
    signed int (16) roll_distance;
}
``` roll_distance is a signed integer that gives the number of samples that are to be decoded in order for a sample to be decoded correctly. A positive value indicates the number of samples after the sample that is a group member that are to be decoded such that at the last of these recovery is complete, i.e. the last sample is correct. A negative value indicates the number of samples before the sample that is a group member to be decoded in order for recovery to be complete at the marked sample. The value zero may not be used; the sync sample table documents random access points for which no recovery roll is needed.

However, imagine that the coded pictures of such a bitstream allow spatial partitioning (e.g. top and bottom sub-pictures) and are distributed to different tracks in the file format, each track with intra coded random access pictures properties at a temporally different sample (e.g. N and N+16), as illustrated in FIG. 19. The recognition of the joint roll distance parameter is not trivial for a player. When several of those tracks are played together to generate a single bitstream, it is not possible to describe the properties of the bitstream accurately in an easy way as the file format roll distance signaling in the file format is track-specific. Obviously, it would be possible to parse each of the tracks and derive the relevant information which is however undesirable for practical reasons.

The above described simply way of achieving a GDR property for several track when jointly played would be to have tracks originally without GDR points but only IDRs that are not aligned. When played together that bitstream would have GDR properties, where once all tracks get an IDR for their corresponding region the roll_distance is equal to the distance between the most apart IDRs for the included tracks/regions.

In one embodiment, a track group box type is defined that indicates the common worst-case roll distance. Thus, a parser would only need to find, e.g. when seeking, a track with an IDR a roll_distance earlier than the seeking time and parsing for all tracks could start.

```
aligned (8) class TrackGroupBox extends Box ('trgr') {
}
aligned (8) class TrackGroupTypeBox
(unsigned int (32) track_group_type)
extends FullBox (track_group_type, version = 0, flags = 0)
{
  unsigned int (32) track_group_id
  if track_group_type == 'cwrd' {
    signed int (32) common_worstcase_roll_distance
  }
}
``` track_group_type indicates the grouping type and shall be set to one of the following values, or a value registered, or a value from a derived specification or registration:
'cwrd' indicates that this track belongs to a group of tracks with the same value of track_group_id of which the common worst case roll distance is equal to common_worstcase_roll_distance when played.

In the described scenario, no individual track has a roll_distance parameter. Another scenario is to also have GDR functionality within the individual sub-pictures, i.e. intra data is spread over a longer time duration than a single picture within each sub-picture track, each sub-picture track carrying an individual roll_distance parameter per sample group signaling as presented in the beginning of this section. Furthermore, the beginning of each per-sub-picture GDR cycle happens at different temporal instances per region. For instance, based on the above example, FIG. 20 illustrates a setup with two sub-pictures (top and bottom) using GDR in each sub-picture individually, e.g. a GDR example with top and bottom sub-pictures, each with different start of GDR cycle. Both sub-pictures have a the same IRAP-distance of 32 frames and the roll distance parameter is a smaller number if regarded per sub-picture individually, e.g. 16 frames. In this setup, it could be that the beginning of the GDR cycle of the top sub-picture occurs 16 frames after the bottom sub-pictures has its respective GDR cycle begin, thereby, spreading the IRAP/intra overhead equally across the whole IRAP-distance interval of 32 frames when regarded as a whole, e.g. in joint decoding and denoted as joint roll distance parameter in FIG. 20.

However, when such independent regions or sub-pictures are placed into separate tracks, e.g. as in 360 degree video streaming with the MPEG OMAF viewport dependent profile, it is currently not possible to indicate in the FF syntax or easily derive such a joint roll distance parameter across tracks that are to be played jointly, except for the case of in-depth track or bitstream parsing and analysis. The latter is however to be avoided in systems out of practicality.

Therefore, it is part of the invention in one embodiment, to indicate a joint roll distance parameter for when a set of tracks that is in the same track group is played. This signalling can be done by means of an additional sample group signaling augmenting the regular sample group signaling for the single-track-playback roll_distance parameter.

```
class VisualCommonRollRecoveryEntry ( )
extends VisualSampleGroupEntry
('tgrl')
{
  unsigned int (32) track_group_id
  signed int (16) common_roll_distance;
}
``` track_group_id is the track group id value for which the indicated roll_distance applies when the tracks with track group id equal to the track_group_id are played.
common roll distance is a signed integer that gives the number of samples from all tracks in the track group with track group id equal to track_group_id to be decoded in order for a sample to be decoded correctly when the tracks of the track group with track_group_id are played. A positive value indicates the number of samples after the sample that is a group member to be decoded such that at the last of these recovery is complete, i.e. the last sample is correct. A negative value indicates the number of samples before the sample that is a group member to be decoded in order for recovery to be complete at the marked sample. The value zero may not be used; the sync sample table documents random access points for which no recovery roll is needed.

5. File Generator 20, File Parser 10 and File 8 According to FIG. 21

Figure 21:
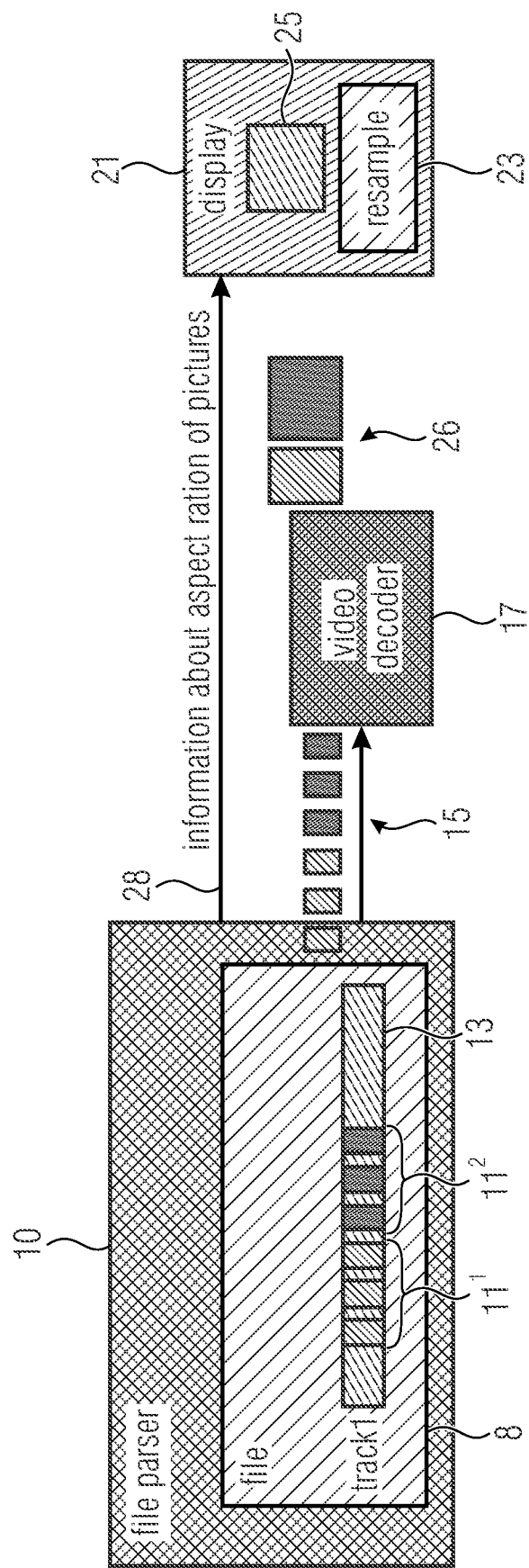
FIG. 21 illustrates an example of a file and a file parser according to the fifth aspect.

FIG. 21 illustrates an example of a file parser 10 which may optionally correspond to the file parser 10 of FIG. 1. FIG. 21 shows the file parser 10 in conjunction with a video decoder 17 and a video player 21. File parser 10, video decoder 17 and video player 21 may be implemented separately from each other or may be implemented within one device. The file parser 10 is configured for receiving a file 8 into which a video bitstream is inserted. The file 8 comprises a track 13 into which the video bitstream is at least partially inserted. The file parser 10 is configured for deriving an information from the file 8 for the track 13, the information indicating whether a pixel aspect ratio using which the video bitstream is coded temporally varies. Embodiments of section 5 may embody the fifth aspect.

As exemplarily illustrated in FIG. 21, the video bitstream may comprise first samples 111 being coded with a first pixel aspect ratio and second samples 112 coded with a second pixel aspect ratio. Consequently, an aspect ratio of a decoded pictures 26 decoded by the video decoder 17 from the video bitstream 15, which may be provided by the file parser 10 to the video decoder 17 as described with respect to FIG. 1, may depend on the pixel aspect ratio of samples from which the decoded picture is decoded. The video player 25 may perform a resampling 23 of the decoded pictures 26 before providing the decoded pictures to an output such as a display. The resampling 23 may account for the different aspect ratios of the decoded picture 26.

Optionally, the file parser 10 may provide an indication 28 about an aspect ratio of the decoded pictures directly to the video player 21, e.g. via an API. Alternatively, the file parser 10 may provide the information in the video bitstream 15.

For example, the file parser 10 may derive the information, whether the pixel aspect ratio changes from descriptive data in the file 8. For example, the descriptive data may be associated with the track 13. For example, the descriptive data may indicate one or more samples, at a position of which the pixel aspect ratio changes, or may indicate the pixel aspect ratio for each of the samples 11, e.g. by associating each of the samples 11 with a sample group for indicating the pixel aspect ratio, e.g. by signaling a table. For example, the file parser 10 may derive whether the pixel aspect ratio changes by inspecting such a sample group or table associating each sample to a pixel aspect ratio. According to one example, a default value for the pixel aspect ratio indicated in the sample group or table indicates that the pixel aspect ratio does not change.

Accordingly, file parser 10 may derive, from the file 8, for each picture of the video bitstream, the pixel width and pixel height valid for the respective picture, e.g. like a table that says for each sample what of the potential pixel aspect ratios defined beforehand is in place for each sample.

For example, for each picture of the video bitstream the pixel width and pixel height valid for the respective picture may be indicated in file 8 by way of a corresponding SEI message.

File generator 20, e.g. of FIG. 2, may accordingly code the information indicating whether the pixel aspect ratio varies, into file 8.

In the following, several alternatives for signaling the information indicating whether the pixel aspect ratio varies in file 8 are described.

For example, Part 12 of MPEG, i.e. MPEG Base Media File Format, has 'pasp' box indicating the pixel aspect ratio that is located in the sample entry and thereby constant within a track. The pixel aspect ratio is given in arbitrary units as follows.

```
class PixelAspectRatioBox extends Box ('pasp') {
    unsigned int (32) hSpacing;
    unsigned int (32) vSpacing;
}
``` hSpacing, vSpacing: define the relative width and height of a pixel.

Note that with RPR in VVC not only the picture dimensions can change from picture to picture but also the aspect ratio of a picture. I.e., the upsampling/downsampling corresponding to one picture can happen in a single direction (horizontally or vertically) or can happen in both directions but with different ratios.

Although the 'pasp' box is optional in the file format and the information is included in the VVC bitstream as specified in the VVC specification, some applications involve the 'pasp' box to be present and it overwrites the video specific signaling:

"These are both optional; if present, they over-ride the declarations (if any) in structures specific to the video codec, which structures should be examined if these boxes are absent."

In one embodiment the 'pasp' box includes information indicating that the pixel aspect ratio is dynamic. For instance, this could be done using the existing syntax elements hSpacing, vSpacing that define the pixel with and height respectively and setting them to 0.

```
class PixelAspectRatioBox extends Box ('pasp') {
    unsigned int (32) hSpacing;
    unsigned int (32) vSpacing;
}
``` hSpacing, vSpacing: define the relative width and height of a pixel; When both hSpacing and vSpacing are equal to 0, it indicates that the aspect ratio may change at any sample within the track.

Alternatively, a new box can be included that indicates dynamic pixel aspect ratio 'dpar' that indicates that the pixel aspect ratio is dynamic.

```
class DynamicPixelAspectRatioBox extends Box ('dpar') {
}
```

One solution for carrying the information about each picture would be mandating in case that the pixel aspect ratio is dynamic the presence of the corresponding SEIs to be carried in band. Therefore, in another embodiment when 'pasp' or 'dpar' indicate that the pixel aspect ratio is dynamic, the sample_aspect_ratio_info SEI message shall be present within the samples in the track. That is, the file generator has to include this message. Consequently, the bitstream has to have the information. And the client is made aware that the information is there and needs to be processed for achieving a correct visual image.

In another embodiment, when the video signal indicates to have a dynamic aspect ratio, e.g. vui_aspect_ratio_constant_flag in VVC, the 'pasp' or 'dpar' boxes are mandatory to be present.

For some applications it would be beneficial when the file format parser can also recognize the exact samples in a track at which aspect ratio changes happen, i.e. be aware that when random-accessing the samples of a track, the aspect ratio changes from what has optionally been indicated in the sample entry. Therefore, in one embodiment of the invention, a sample group is defined that indicates a aspect ratio change. That is, the file comprises an indication of pictures of the video bitstream at which the pixel aspect ratio changes, i.e. the file generator 20 may indicate, in the file, pictures of the video bitstream at which the pixel aspect ratio changes.

```
abstract class AspectRatioChangeSampleGroupEntry (unsigned int (32)
grouping_type) extends Visual SampleGroupEntry (grouping_type)
{
}
```

Also, it could be beneficial to a file format parser to recognize the correct sample aspect ratio at each of these aspect ratio change points directly from file format syntax. Therefore, in another embodiment, a sample grouping indicating an aspect ratio change also includes information about the sample aspect ratio from thereon as follows. That is, the file generator 20 may indicate pictures of the video bitstream at which the pixel aspect ratio changes and the pixel width and pixel height valid from the pictures onwards. Consequently, file 8 may comprise such an indication.

```
class AspectRatioDetailEntry ( ) extends VisualSampleGroupEntry
('arcg')
{
    unsigned int (32) hSpacing;
    unsigned int (32) vSpacing;
}
``` hSpacing, vSpacing: define the relative width and height of a pixel;

Note that, although not necessarily the case, some applications would benefit of limiting the pixel aspect ratio to be constant within the bitstream. That means that the pixel aspect ratio should be such that the picture aspect ratio stays constant within the output video when applying the sample aspect ratio. Therefore, in another embodiment a track of a file is to be marked, e.g. using a brand, to determine that the picture aspect ratio stays constant by restricting the pixel aspect ratio in such a manner that counters the upsampling/downsampling of pictures within the video. (cp. H1.1 first alternative) E.g. if a video starts with a sample aspect ratio of x:y a output picture size of W×H (after applying the cropping window in the video decoder) and at a certain point in time, i.e. sample, the size of a output picture changes to $W^2 \times H$, the sample aspect ratio of that picture with a different size shall be 2*x:y.

This sample aspect ratio is typically used to inform the display about the properties of a decoded picture for further processing as illustrated in FIG. 21. As shown below, two decoded pictures (after video decoder) might have different sizes and aspect ratios. The display needs to know that information to be able to resample those picture to the proper display target size.

The information about one or more aspect ratio pairs of pictures in the video bitstream can serve as a selection criterion for the device/file format parser that is configured to selection of tracks for playback that matches a particular information given over its API, e.g. device capabilities. For instance, a file format parser could select a track to start playback but switch to another track once the aspect ratio of the track changes. Or a device/file format parser might decide to not parse a track with dynamic pixel aspect ratio as the display of the device might not be able to consume such content.

Furthermore, the aspect ratio pair information is typically further processed in the file format parser, e.g. by classifying (e.g. additionally or alternatively to sending the above indication) the ratio pairs with respect to common properties such as the relation to the target resolution or aspect ratio of the device for further processing steps. Another example of further processing of the one or more aspect ratio pairs of pictures in the video bitstream is grouping of aspect ratios according to available processing blocks such as re-/up-/downsample filters on the device.

6. Further Embodiments

In the following, further embodiments are described, referring to all of the previous sections.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded image signal or file can be stored on a digital storage medium or can be transmitted on a transmission medium such as a wireless transmission medium or a wired transmission medium such as the Internet.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

In the foregoing Detailed Description, it can be seen that various features are grouped together in examples for the purpose of streamlining the disclosure. This method of disclosure is not to be interpreted as reflecting an intention that the claimed examples involve more features than are expressly recited in each claim. Rather, as the following claims reflect, subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. File format parser configured to
receive a file comprising a set of tracks onto which sub-streams of a video bitstream are distributed;
inspect descriptive data within the file whether the descriptive data indicates for a predetermined track of the set of tracks, that a parameter set present in the file for the predetermined track is to be ignored when jointly decoding sub-streams distributed onto more than the predetermined track of the set of tracks;
if the descriptive data indicates for the predetermined track of the set of tracks, that the parameter set present in the file for the predetermined track are to be ignored when jointly decoding the sub-streams distributed onto the more than the predetermined track of the set of tracks, forwarding the sub-streams distributed onto the more than the predetermined track of the set of tracks to decoding without forwarding the parameter set, and
if the descriptive data does not indicate for the predetermined track of the set of tracks, that the parameter set present in the file for the predetermined track are to be ignored when jointly decoding the sub-streams distributed onto the more than the predetermined track of the set of tracks, forwarding the parameters set along with the sub-streams distributed onto more than the predetermined track of the set of tracks to the decoding;
wherein
the parameter set is comprised by the predetermined track in-band within one or more sub-streams comprised by the predetermined track, and the file format parser is configured to
if the descriptive data indicates for the predetermined track of the set of tracks, that the parameter set present in the predetermined track is to be ignored when jointly decoding the sub-streams distributed onto the more than the predetermined track of the set of tracks,
strip the parameter set off the one or more sub-streams comprised by the predetermined track to yield a stripped version of the one or more sub streams comprised by the predetermined track and forward the stripped version along with one or more sub-streams comprised by any other track of the set of tracks to the decoding, and
if the descriptive data does not indicate for the predetermined track of the set of tracks, that the parameter set present in the predetermined track is to be ignored when jointly decoding the sub-streams distributed onto the more than the predetermined track of the set of tracks,
forward the one or more sub-streams comprised by the predetermined track along with the one or more sub-streams comprised by any other track of the set of tracks to the decoding with the parameters set remaining in the one or more sub-streams comprised by the predetermined track, or
the parameter set is comprised by one or more boxes of the file and the file format parser is configured to
if the descriptive data indicates for the predetermined track of the set of tracks, that the parameter set is to be ignored when jointly decoding the sub-streams distributed onto the more than the predetermined track of the set of tracks,
forward the one or more sub-streams comprised by the predetermined track along with the one or more sub-streams comprised by any other track of the set of tracks to the decoding without the parameter set is, and
if the descriptive data does not indicate for the predetermined track of the set of tracks, that the parameter set is to be ignored when jointly decoding the sub streams distributed onto the more than the predetermined track of the set of tracks, forward the one or more sub-streams comprised by the predetermined track
along with the one or more sub-streams comprised by any other track of the set of tracks to the decoding and along with the parameters set present in the one or more boxes.

2. File format parser of claim 1, configured to derive the descriptive data from a sample entry of the predetermined track.

3. File format parser of claim 1, configured to derive the descriptive data from a track dependency box which, in addition to indicating whether the parameter set present in the file for the predetermined track are to be ignored when jointly decoding the sub-streams distributed onto the set of tracks, indicates for a further predetermined track of the set of tracks a dependency on the predetermined track.

4. File format parser of claim 1, configured to derive the descriptive data from a sample entry of a further predetermined track of the set of tracks which is dependent on the predetermined track.

5. File format parser of claim 1, configured to
Perform the inspection based on a type of the sample entry or based on a syntax element within a sample entry of the predetermined track.

6. File format parser of claim 1, configured to
if the parameter set is comprised by the predetermined track in-band within the one or more sub-streams comprised by the predetermined track,
if the descriptive data indicates for the predetermined track of the set of tracks, that the parameter set is to be ignored when jointly decoding the sub-streams distributed onto the more than the predetermined track of the set of tracks,
strip the parameter set off the one or more sub-streams comprised by the predetermined track to yield a stripped version of the one or more sub-streams comprised by the predetermined track and forward the stripped version along with the one or more sub-streams comprised by any other track of the set of tracks to the decoding, and
if the descriptive data does not indicate for the predetermined track of the set of tracks, that the parameter set is to be ignored when jointly decoding the sub-streams distributed onto the more than the predetermined track of the set of tracks,
forward the one or more sub-streams comprised by the predetermined track along with the one or more sub-streams comprised by any other track of the set of tracks to the decoding with the parameters set is remaining in the one or more sub-streams comprised by the predetermined track, and
if the parameter set is comprised by one or more boxes of the file
if the descriptive data indicates for the predetermined track of the set of tracks, that the parameter set is to be ignored when jointly decoding the sub-streams distributed onto the more than the predetermined track of the set of tracks,
forward the one or more sub-streams comprised by the predetermined track along with the one or more sub-streams comprised by any other track of the set of tracks to the decoding without the parameter set is, and
if the descriptive data does not indicate for the predetermined track of the set of tracks, that the parameter set is to be ignored when jointly decoding the sub-streams distributed onto the more than the predetermined track of the set of tracks,
forward the one or more sub-streams comprised by the predetermined track along with the one or more associated sub-streams comprised by any other track of the set of tracks to the decoding and along with the parameters set present in the one or more boxes.

7. File format parser of claim 1, configured to
if the descriptive data indicates for the predetermined track of the set of tracks, that the parameter set is to be ignored when jointly decoding the sub-streams distributed onto the more than the predetermined track of the set of tracks,
if the parameter set is comprised by the predetermined track in-band within the one or more sub-streams comprised by the predetermined track,
strip the parameter set off the one or more sub-streams comprised by the predetermined track to yield a stripped version of the one or more sub-streams comprised by the predetermined track and forward the stripped version along with the one or more sub-streams comprised by any other track of the set of tracks to the decoding, and
if the parameter set is comprised by one or more boxes of the file,
forward the one or more sub-streams comprised by the predetermined track along with the one or more sub-streams comprised by any other track of the set of tracks to the decoding and along with the parameters set present in the one or more boxes and
if the descriptive data does not indicate for the predetermined track of the set of tracks, that the parameter set is to be ignored when jointly decoding the sub-streams distributed onto the more than the predetermined track of the set of tracks,
if the parameter set is comprised by the predetermined track in-band within the one or more sub-streams comprised by the predetermined track,
forward the one or more sub-streams comprised by the predetermined track along with the one or more associated sub-streams comprised by any other track of the set of tracks to the decoding with the parameters set is remaining in the one or more sub-streams comprised by the predetermined track, and
if the parameter set is comprised by one or more boxes of the file,
forward the one or more sub-streams comprised by the predetermined track along with the one or more sub-streams comprised by any other track of the set of tracks to the decoding and along with the parameters set present in the one or more boxes, OR
if the descriptive data indicates for the predetermined track of the set of tracks, that the parameter set is to be ignored when jointly decoding the sub-streams distributed onto the more than the predetermined track of the set of tracks,
if the parameter set is comprised by the predetermined track in-band within the one or more sub-streams comprised by the predetermined track,
forward the one or more sub-streams comprised by the predetermined track along with the one or more sub-streams comprised by any other track of the set of tracks to the decoding with the parameters set is remaining in the one or more sub-streams comprised by the predetermined track, and
if the parameter set is comprised by one or more boxes of the file,
forward the one or more sub-streams comprised by the predetermined track along with the one or more associated sub-streams comprised by any other track of the set of tracks to the decoding without the parameter set is, and
if the descriptive data does not indicate for the predetermined track of the set of tracks, that the parameter set is to be ignored when jointly decoding the sub-streams distributed onto the more than the predetermined track of the set of tracks, if the parameter set is comprised by the predetermined track in-band within the one or more sub-streams comprised by the predetermined track,
   forward the one or more sub-streams comprised by the predetermined track along with the one or more sub-streams comprised by any other track of the set of tracks to the decoding with the parameters set is remaining in the one or more sub-streams comprised by the predetermined track, and
if the parameter set is comprised by one or more boxes of the file,
   forward the one or more sub-streams comprised by the predetermined track along with the one or more sub-streams comprised by any other track of the set of tracks to the decoding and along with the parameters set present in the one or more boxes.

8. File format parser of claim 6, wherein the one or more boxes are comprised by a sample entry of the predetermined track or within a parameter set track associated with the predetermined track.

9. File format parser of claim 1, wherein the parameter set relates to one or more of VPS, PPS, SPS and APS.

10. File format parser of claim 1, wherein the parameter set is specified by the descriptive data in the file by NAL unit type.

11. File format parser of claim 1, configured to derive from the descriptive data information whether no in-band parameter set is present in the file for the predetermined track or
   information whether for the predetermined track in the file only parameter sets of a first set of one or more parameter set types are present in-band within the one or more sub-streams comprised by the predetermined block, while the parameter set is comprised by one or more boxes of the file and is of a parameter set type comprised by a second set of one or more parameter set types which is disjoint to the first set.

12. File format parser of claim 1, wherein the set of tracks indicated to be linked to form the set of tracks by a assigning a common track group ID to the tracks of the set of tracks.

13. File format parser of claim 1, configured to suppress the inspection and infer that the parameter set present in the file for the predetermined track is not to be ignored when jointly decoding the sub-streams distributed onto the set of tracks, if the predetermined track comprises at least one in band parameter set.

14. Method for processing a file, the method comprising:
   receive the file, the file containing a set of tracks onto which sub-streams of a video bitstream are distributed;
   inspect descriptive data within the file whether the descriptive data indicates for a predetermined track of the set of tracks, that a parameter set present in the file for the predetermined track is to be ignored when jointly decoding sub-streams distributed onto more than the predetermined track of the set of tracks;
   if the descriptive data indicates for the predetermined track of the set of tracks, that the parameter set present in the file for the predetermined track are to be ignored when jointly decoding the sub-streams distributed onto the more than the predetermined track of the set of tracks, forwarding the sub-streams distributed onto the more than the predetermined track of the set of tracks to decoding without forwarding the parameter set, and
   if the descriptive data does not indicate for the predetermined track of the set of tracks, that the parameter set present in the file for the predetermined track are to be ignored when jointly decoding the sub-streams distributed onto the more than the predetermined track of the set of tracks, forwarding the parameters set along with the sub-streams distributed onto more than the predetermined track of the set of tracks to the decoding;
wherein
the parameter set is comprised by the predetermined track in-band within one or more sub-streams comprised by the predetermined track, and the file format parser is configured to
if the descriptive data indicates for the predetermined track of the set of tracks, that the parameter set present in the predetermined track is to be ignored when jointly decoding the sub-streams distributed onto the more than the predetermined track of the set of tracks,
strip the parameter set off the one or more sub-streams comprised by the predetermined track to yield a stripped version of the one or more sub streams comprised by the predetermined track and forward the stripped version along with one or more sub-streams comprised by any other track of the set of tracks to the decoding, and
if the descriptive data does not indicate for the predetermined track of the set of tracks, that the parameter set present in the predetermined track is to be ignored when jointly decoding the sub-streams distributed onto the more than the predetermined track of the set of tracks,
forward the one or more sub-streams comprised by the predetermined track along with the one or more sub-streams comprised by any other track of the set of tracks to the decoding with the parameters set remaining in the one or more sub-streams comprised by the predetermined track, or
the parameter set is comprised by one or more boxes of the file and the file format parser is configured to
if the descriptive data indicates for the predetermined track of the set of tracks, that the parameter set is to be ignored when jointly decoding the sub-streams distributed onto the more than the predetermined track of the set of tracks,
forward the one or more sub-streams comprised by the predetermined track along with the one or more sub-streams comprised by any other track of the set of tracks to the decoding without the parameter set is, and
if the descriptive data does not indicate for the predetermined track of the set of tracks, that the parameter set is to be ignored when jointly decoding the sub streams distributed onto the more than the predetermined track of the set of tracks, forward the one or more sub-streams comprised by the predetermined track along with the one or more sub-streams comprised by any other track of the set of tracks to the decoding and along with the parameters set present in the one or more boxes.

* * * * *